(12) United States Patent  
Inoue et al.

(10) Patent No.: US 8,376,455 B2
(45) Date of Patent: Feb. 19, 2013

(54) SEAT HEIGHT ADJUSTMENT APPARATUS FOR MOTORCYCLE

(75) Inventors: Yoshihiro Inoue, Saitama (JP); Konichi Misaki, Saitama (JP); Hiroyuki Seki, Saitama (JP); Masayuki Kinoshita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 12/873,745

(22) Filed: Sep. 1, 2010

(65) Prior Publication Data

US 2011/0057486 A1 Mar. 10, 2011

(30) Foreign Application Priority Data

Sep. 9, 2009 (JP) ................................. 2009-208385

(51) Int. Cl.
*B62J 1/00* (2006.01)
(52) U.S. Cl. ................. 297/215.15; 297/243; 297/195.1; 297/195.12; 297/215.13; 297/313; 180/219
(58) Field of Classification Search .................. 297/243, 297/195.1, 195.12, 215.13, 215.15, 344.12, 297/313; 180/219
See application file for complete search history.

(56) References Cited

U.S. PATENT DOCUMENTS

| 4,413,700 A | * | 11/1983 | Shiratsuchi | 180/219 |
| 4,462,634 A | * | 7/1984 | Hanagan | 297/201 |
| 5,533,783 A | * | 7/1996 | Harms et al. | 297/195.13 |
| 6,247,549 B1 | * | 6/2001 | Krams et al. | 180/219 |

FOREIGN PATENT DOCUMENTS

| GB | 2 379 431 A | | 3/2003 |
| JP | 09011947 A | * | 1/1997 |
| JP | 2003-81157 A | | 3/2003 |

* cited by examiner

*Primary Examiner* — Laurie Cranmer
(74) *Attorney, Agent, or Firm* — Birch, Stewart, Kolasch & Birch, LLP

(57) ABSTRACT

A seat height adjustment apparatus includes a stepped portion provided on a bottom plate of a seat and formed in a stepped configuration, an adjust member removably attached to the stepped portion and having a lower face placed on a seat rail for adjusting the height between the seat rail and the seat, and vehicle body side fixing members provided on the seat rail for abutting with an abutting portion to fix the adjust member. Upon seat height adjustment, adjustment of the seat height can be carried out simply only by replacing the adjust member to an arbitrary stage of the stepped portion. Further, since the seat height adjustment apparatus is formed from the three parts of the stepped portion, adjust member and vehicle body side fixing member, the number of parts is reduced.

20 Claims, 17 Drawing Sheets

Fr ←——→ Rr

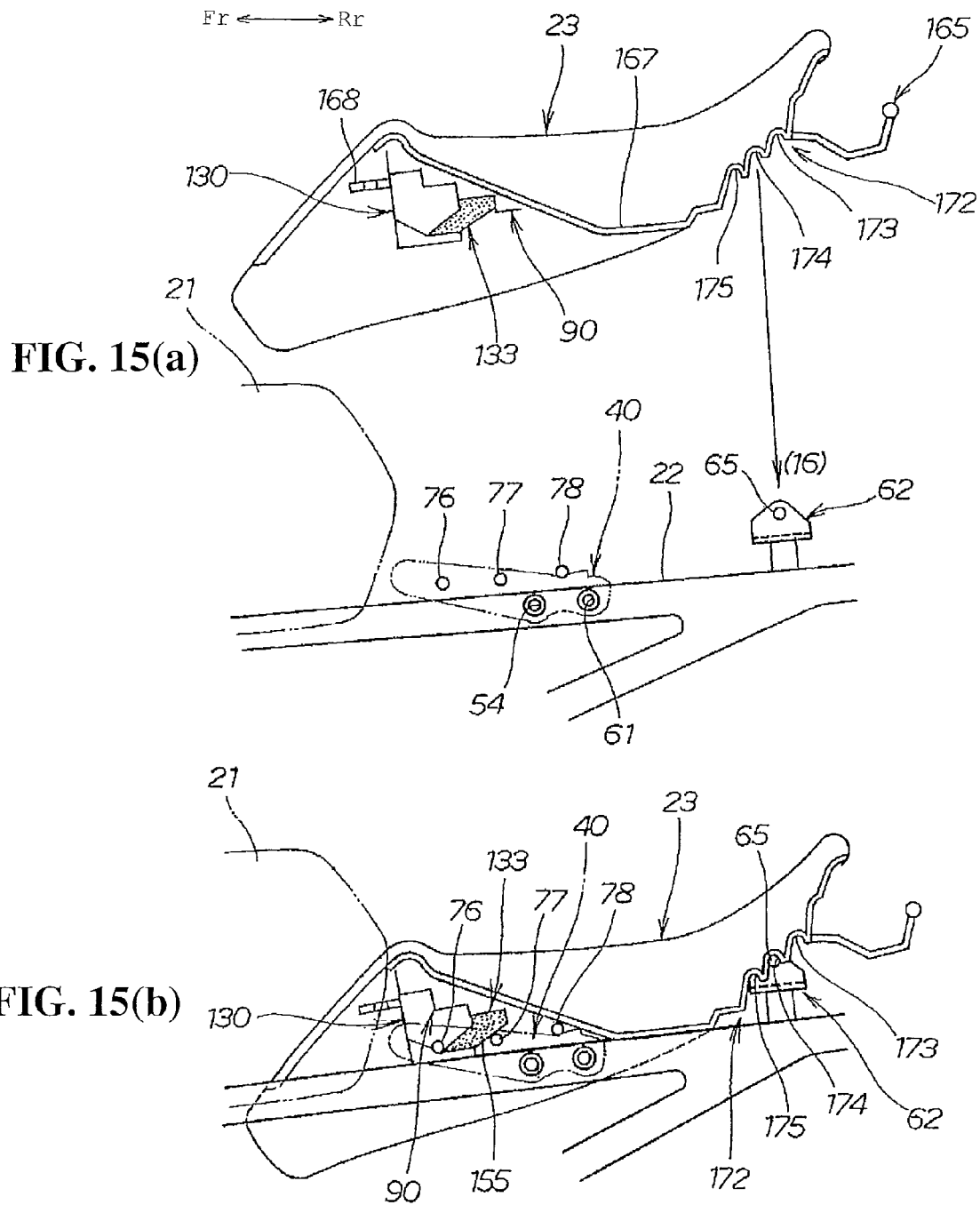

FIG. 17(a)
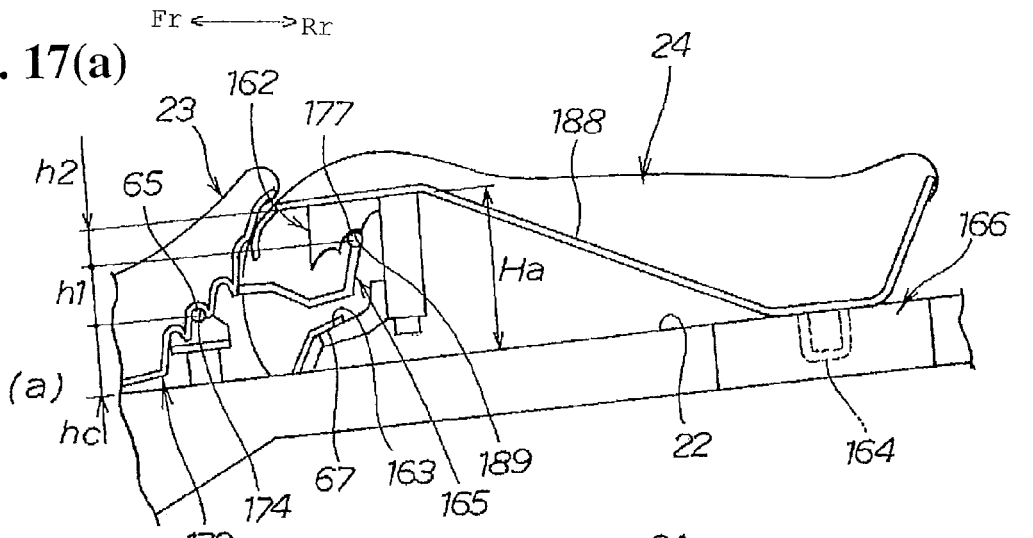
FIG. 17(b)
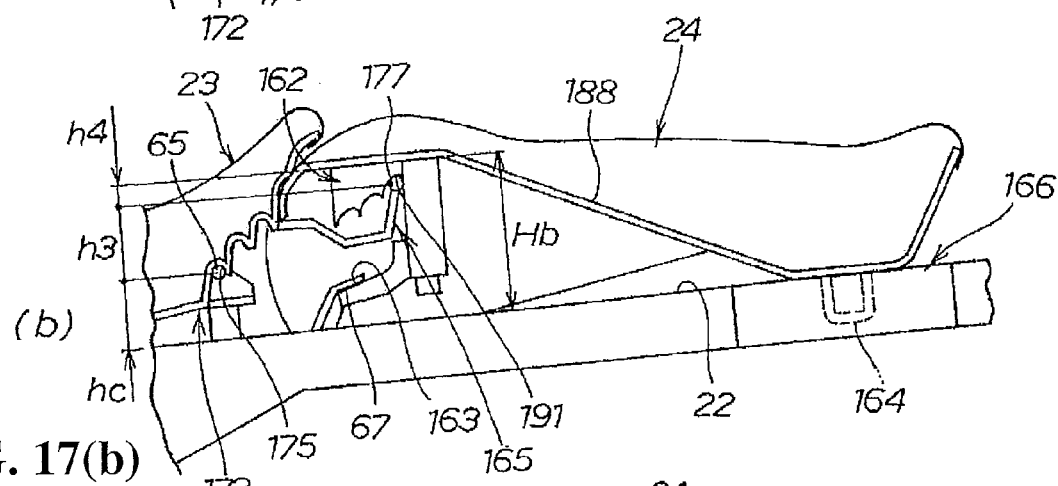
FIG. 17(c)

SEAT HEIGHT ADJUSTMENT APPARATUS FOR MOTORCYCLE

CROSS-REFERENCE TO RELATED APPLICATIONS

The present application claims priority under 35 USC 119 to Japanese Patent Application No. 2009-208385 filed on Sep. 9, 2009 the entire contents of which are hereby incorporated by reference.

BACKGROUND OF THE INVENTION

1. Field of the Invention

This invention relates to a seat height adjustment apparatus for a motorcycle which makes it possible to adjust the height of a driver's seat of a motorcycle.

2. Description of Background Art

For a motorcycle, a footing property for a driver is demanded. The footing property depends upon the height from the ground to the driver's seat and the size of the body of the driver. Therefore, it is desired to provide a motorcycle with a seat height adjustment apparatus.

Various proposals have been made for a motorcycle provided with a seat height adjustment apparatus in related art. See, for example, Japanese Patent Laid-Open No. 2003-81157, FIGS. 19 and 21.

As shown in FIG. 19 of Japanese Patent Laid-Open No. 2003-81157, the seat height adjustment apparatus for a motorcycle includes a front cross plate 56 (this indicates a reference symbol applied in Japanese Patent Laid-Open No. 2003-81157 this similarly applies also to the description given below) fixed to a vehicle body frame, adjuster brackets 57 fixed to the front cross plate 56, adjust guides 59 disposed between two support plate portions provided on the adjuster brackets 57, a pin member 60 inserted in a slot 50 of the adjuster brackets 57 and a hole 59a of the adjust guides 59. Fixing members 56a, attached after washers 60a, are fitted to an end portion of the pin member 60 with a second pin member 62 inserted in a guide slot 58 of the adjuster brackets 57 and a second hole 59b of the adjust guides 59. In addition, fixing members 56a, attached after washers 60a, are fitted to an end portion of the second pin member 62.

Since another assembly of an adjuster bracket 57 and an adjust guide 59 is provided in a vehicle body widthwise direction in addition to the assembly shown, a single adjuster bar 61 is attached to the adjuster guides 59 of the two assemblies, and a spring 63 is attached between the adjuster bar 61 and the front cross plate 56. Further, the adjuster bar 61 is a member which engages with a projection 10A of a driver's seat 10. Now, the operation of the seat height adjustment apparatus is described.

As shown in FIG. 21(a) of Japanese Patent Laid-Open No. 2003-81157, in the seat height adjustment apparatus, since the pin member 60 is engaged with a lower stage of the slot 50 and the second pin member 62 is fitted in the guide slot 58, the adjuster bar 61 stops stationarily at a low position. On the other hand, at a rear portion of the driver's seat 10, a rear concave step 54 is fitted with a convex third supporting portion 53 provided on the vehicle body frame. If the projection (reference symbol 10A of FIG. 19 of Japanese Patent Laid-Open No. 2003-81157) of the driver's seat 10 is engaged with the adjuster bar 61, then the driver's seat 10 assumes a low position.

If the adjuster bar 61 is pulled rearwardly of the vehicle body once against the tensile force of the spring (reference symbol 63 of FIG. 19 of Japanese Patent Laid-Open No. 2003-81157) and then it is returned forwardly of the vehicle body so that the pin member 60 is engaged with a middle stage of the slot 50, then the adjuster bar 61 stops stationarily at an intermediate position as shown in FIG. 21(b) of Japanese Patent Laid-Open No. 2003-81157. Meanwhile, rearwardly of the driver's seat 10, since the central concave step 54 is fitted with the convex third supporting portion 53 on the vehicle body side, the driver's seat 10 assumes an intermediate position.

Similarly as in the seat adjustment described above, the pin member 60 is engaged with an upper stage of the slot 50 and, rearwardly of the driver's seat 10, the front concave step 54 is fitted with the convex third supporting portion 53 on the vehicle body side as shown in FIG. 21(c) of Japanese Patent Laid-Open No. 2003-81157. As a result, the driver's seat 10 assumes a high position.

In addition, since the seat height adjustment apparatus of Japanese Patent Laid-Open No. 2003-81157 has a great number of parts as shown in FIG. 19 of Japanese Patent Laid-Open No. 2003-81157, the cost required for working and assembly is high. It is further preferable that, even if the number of parts of the seat height adjustment apparatus is decreased, the height of the driver's seat 10 can be adjusted simply.

Therefore, a seat height adjustment apparatus for a motorcycle which includes a reduced number of parts and can adjust the height of a seat simply is in demand.

SUMMARY AND OBJECTS OF THE INVENTION

It is an object of an embodiment of the present invention to provide a seat height adjustment apparatus for a motorcycle which can reduce the number of parts to permit a simple adjustment of the height of a seat.

According to an embodiment of the present invention, a seat height adjustment apparatus for a motorcycle for making it possible to adjust the height of a driver's seat includes a stepped portion provided on a bottom plate of the driver's seat and having a plurality of stages formed in a stepped configuration in a forward and backward direction of the vehicle, an adjust member removably attached to the stepped portion and having a lower face placed on a seat rail for adjusting the height between the seat rail and the driver's seat, and vehicle body side fixing means provided on the seat rail for abutting with part of the adjust member to fix the adjust member.

According to an embodiment of the present invention, the seat height adjustment apparatus for a motorcycle has a fitting portion for fitting with the stepped portion, and a fixing portion for removably fitting with the driver's seat side to restrict movement of the adjust member.

According to an embodiment of the present invention, an erroneous assembly preventing member for disabling part of the adjust member from fitting with the vehicle body side fixing means when the part of the adjust member is assembled in error to the vehicle body side fixing means is provided between the adjust member and the vehicle body side fixing means.

According to an embodiment of the present invention, the seat height adjustment apparatus for a motorcycle includes, where the motorcycle has a passenger's seat disposed rearwardly of the driver's seat, a stepped fixing member corresponding to the stepped portion that is provided on the bottom plate at a rear portion of the driver's seat. A coupling member for coupling the fixing member to a front end of the passenger's seat is provided at a rear end portion of the fixing member.

According to an embodiment of the present invention, the seat height adjustment apparatus for a motorcycle includes the vehicle body side fixing means that is fastened to a vehicle body frame together with a fuel tank.

According to an embodiment of the present invention, the seat height adjustment apparatus for a motorcycle includes the adjust member that is formed from a left adjust member and a right adjust member removably mounted on a left stepped portion and a right stepped portion which are provided in a left and right pair on the bottom plate of the driver's seat.

According to an embodiment of the present invention, the seat height adjustment apparatus for a motorcycle includes each of the stepped portion and the fitting portion being formed in two rows.

According to an embodiment of the present invention, the adjust member is disposed between the stepped portion provided on the bottom plate of the driver's seat and the seat rail and is fixed by the vehicle body side fixing means wherein part of the adjust member abuts, and is removably attached to the stepped portion. Since the adjust member is removably attached to the stepped portion, the adjust member can be replaced to an arbitrary stage of the stepped portion.

If replacement of the adjust member is carried out, then since the position of the adjust member in the heightwise direction of the vehicle with respect to the driver's seat is varied, when the adjust member is placed on the seat rail, the height of the driver's seat can be varied. Accordingly, when it is desired to adjust the height of the driver's seat, the height of the driver's seat can be adjusted simply only by replacing the adjust member to an arbitrary stage of the stepped portion.

Further, with the seat height adjustment apparatus, since the height of the driver's seat can be adjusted by the stepped portion, the adjust member and the vehicle body side fixing means, a reduction in the number of parts can be carried out in comparison with an apparatus which includes a great number of parts and is complicated.

According to an embodiment of the present invention, it is possible to provide a seat height adjustment apparatus for a motorcycle which can reduce the number of parts to permit a simple adjustment of the height of the seat.

According to an embodiment of the present invention, the adjust member has the fitting portion for fitting with the stepped portion, and the fixing portion for removably fitting with the driver's seat side to restrict movement of the adjust member. When the adjust member is attached to the driver's seat, since the fitting portion is fitted with the stepped portion, mounting of the adjust member is smoothened. Further, since the fixing portion is fitted with the driver's seat side, it can be confirmed readily that the adjust member has been fixed to the driver's seat successfully.

According to an embodiment of the present invention, the erroneous assembly preventing member for disabling part of the adjust member from fitting with the vehicle body side fixing means when the part of the adjust member is assembled in error to the vehicle body side fixing means is provided between the adjust member and the vehicle body side fixing means. Therefore, the erroneous assembly of the adjust member to the vehicle body side fixing means can be prevented.

According to an embodiment of the present invention, the stepped fixing member corresponding to the stepped portion is provided on the bottom plate at the rear portion of the driver's seat, and the coupling member for coupling the fixing member to the front end of the passenger's seat is provided at the rear end portion of the fixing member. Therefore, when the driver's seat is moved in the forward or backward direction of the vehicle, the rear end portion of the driver's seat and the front end of the passenger's seat can be fixed in accordance with the movement of the driver's seat.

According to an embodiment of the present invention, the vehicle body side fixing means is fastened to the vehicle body frame together with the fuel tank. Therefore, there is no necessity to fasten the vehicle body side fixing means and the fuel tank individually to the vehicle body frame, and the fastening part can be used commonly.

According to an embodiment of the present invention, the adjust member is formed from the left adjust member and the right adjust member removably mounted on the left stepped portion and the right stepped portion which are provided in a left and right pair on the bottom plate of the driver's seat. Since the left adjust member and the right adjust member are individually placed on the seat rail in a state wherein they are attached to the bottom plate of the driver's seat, the load of a person seated on the driver's seat can be received equally on the left and right by them.

According to an embodiment of the present invention, each of the stepped portion and the fitting portion is formed in two rows. Therefore, the coupling between the driver's seat and the adjust member can be further strengthened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 15(a) and 15(b) are views illustrating a form of wrong assembly regarding the driver's seat;

FIGS. 17(a) to 17(c) are views illustrating a relationship in height between the passenger's seat and the driver's seat.

DETAILED DESCRIPTION OF THE PREFERRED EMBODIMENTS

An embodiment of the present invention is described below with reference to the accompanying drawings. It is to be noted that the drawings should be viewed in the direction of reference symbols. Further, the front and rear and the left and right are defined with reference to a driver seated on a driver's seat.

An embodiment of the present invention is described with reference to the drawings.

Figure 1:
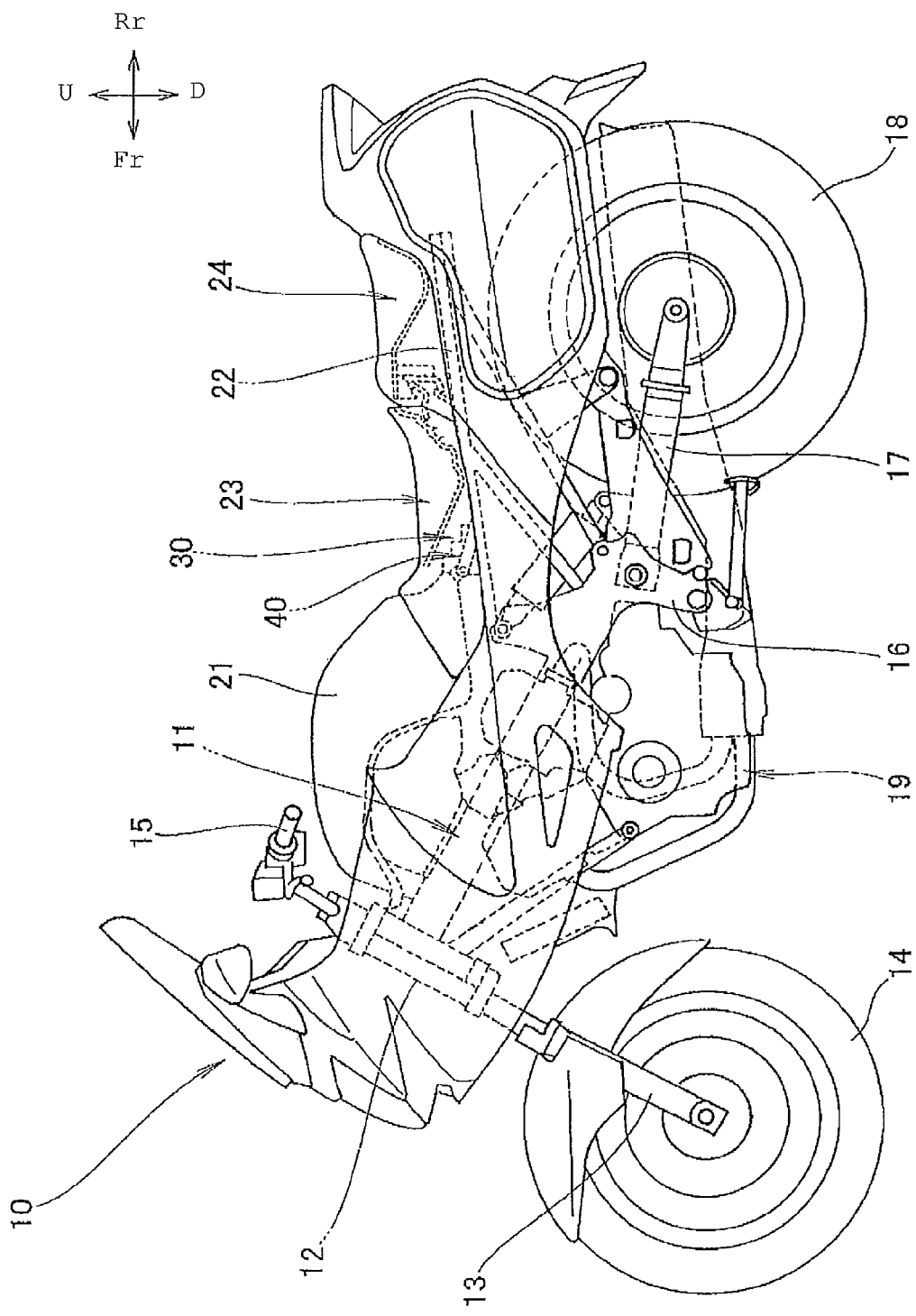
FIG. 1 is a left side elevational view of a motorcycle.

As shown in FIG. 1, a motorcycle 10 is a vehicle which includes a front fork 13 provided for steering operation on a head pipe 12 of a vehicle body frame 11, a front wheel 14 provided for rotation at a lower end of the front fork 13, a steering handle bar 15 provided at an upper end of the front fork 13, a swing arm 17 provided for upward and downward rocking motion on a pivot plate 16 extending downwardly from a rear portion of the vehicle body frame 11, a rear wheel 18 provided for rotation at a rear end of the swing arm 17, an engine 19 disposed below the vehicle body frame 11, a fuel tank 21 disposed above the vehicle body frame 11, a seat rail 22 extending rearwardly from the upper side of a rear portion of the vehicle body frame 11, a driver's seat 23 (details are hereinafter described) disposed on the seat rail 22 in a contacting relationship with a rear portion of the fuel tank 21, a passenger's seat 24 (details are hereinafter described) disposed on the seat rail 22 in a contacting relationship with a rear portion of the driver's seat 23, and a seat height adjustment apparatus 30 (details are hereinafter described) provided between the seat rail 22 and the driver's seat 23.

The seat height adjustment apparatus 30 includes vehicle body side fixing means 40 (details are hereinafter described), and this vehicle body side fixing means 40 is assembled to the seat rail 22. A procedure of assembling the vehicle body side fixing means 40 to the seat rail 22 is described with reference to FIG. 2.

Figure 2:
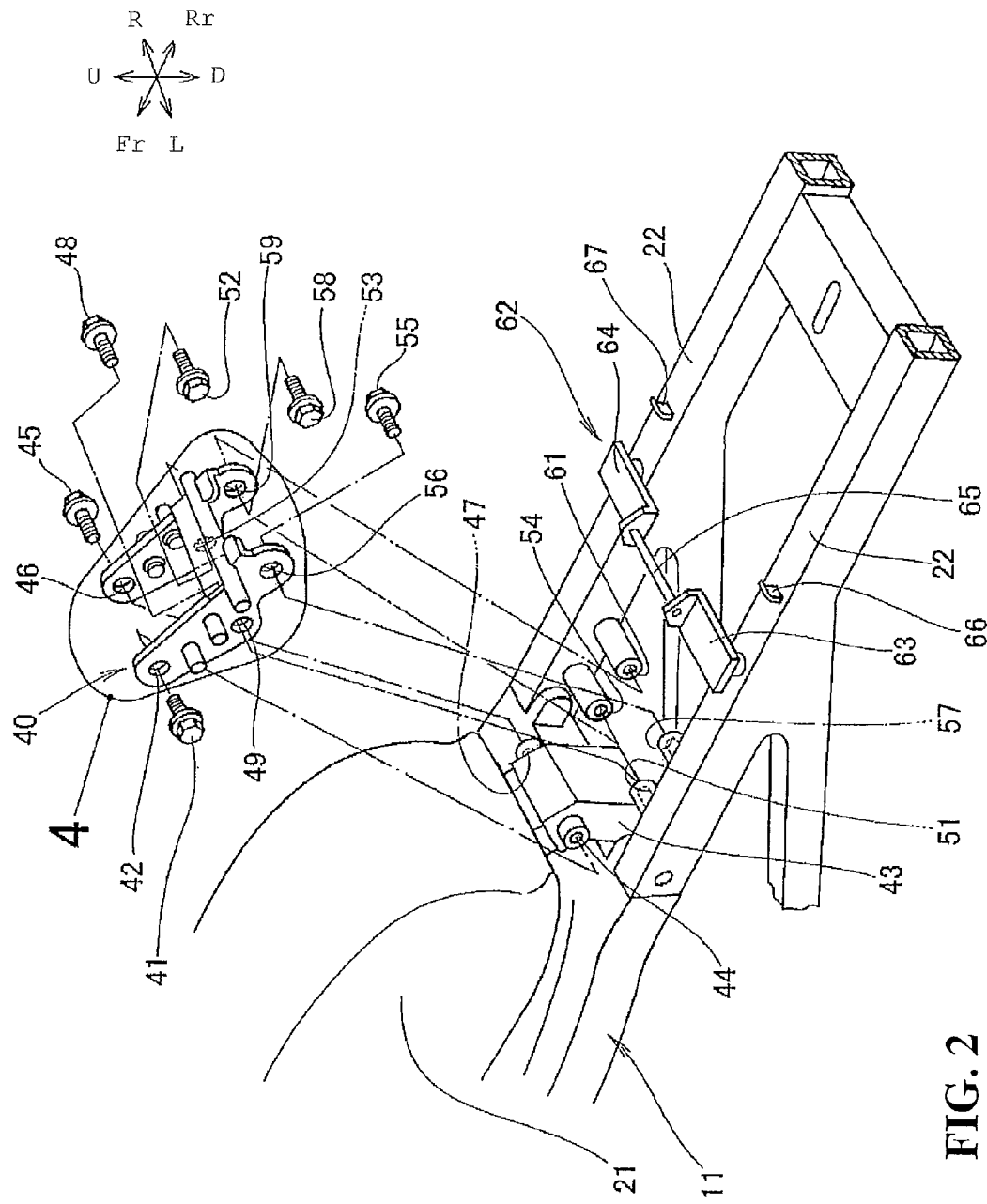
FIG. 2 is a view illustrating a procedure of assembling vehicle body side fixing means to a seat rail.

As shown in FIG. 2, when the vehicle body side fixing means 40 is to be assembled to the seat rails 22, 22, a bolt 41 is inserted into a left front hole 42 of the vehicle body side fixing means 40 and screwed into a left threaded hole 44 of a connecting portion 43 of the seat rails 22, 22 and the fuel tank 21. In addition, a bolt 45 is inserted into a right front hole 46 of the vehicle body side fixing means 40 and screwed into a right threaded hole 47 of the connecting portion 43. Then, a bolt 48 is inserted into a left intermediate hole 49 of the vehicle body side fixing means 40 and screwed into a left threaded hole 51 of the left seat rail 22, and a bolt 52 is inserted into a right intermediate hole 53 of the vehicle body side fixing means 40 and screwed into a right threaded hole 54 of the right seat rail 22. Furthermore, a bolt 55 is inserted into a left rear hole 56 of the vehicle body side fixing means 40 and screwed into a left threaded hole 57 of the left seat rail 22, and a bolt 58 is inserted into a right rear hole 59 of the vehicle body side fixing means 40 and screwed into a right threaded hole 61 of the right seat rail 22.

The vehicle body side fixing means 40 is fastened to the connecting portion 43 together with the fuel tank 21 by the bolt 41 and the bolt 45. The fastening parts can be used commonly without the necessity to fasten the fuel tank 21 individually to the seat rails 22, 22.

At intermediate portions of the seat rails 22, 22 in the vehicle forward and backward direction, a seat supporting member 62 is provided such that it bridges the left seat rail 22 and the right seat rail 22. The seat supporting member 62 includes a left supporting member 63 disposed on the left side in the vehicle widthwise direction for supporting the left side of a rear portion of the driver's seat (reference symbol 23 in FIG. 1), a right supporting member 64 disposed on the right side in the vehicle widthwise direction for supporting the right side of the rear portion of the driver's seat, and a central supporting member 65 formed like a bar bridging the left supporting member 63 and the right supporting member 64 for supporting a central portion of the rear portion of the driver's seat.

In addition, a left pawl member 66 is provided only on the left seat rail 22 rearwardly of the left supporting member 63, and the left pawl member 66 is bent and extends rearwardly. Meanwhile, a right pawl member 67 is provided on the right seat rail 22 rearwardly of the right supporting member 64, and the right pawl member 67 is bent and extends rearwardly. Now, a procedure of assembling the driver's seat and the passenger's seat to the seat rails 22, 22 is described.

Figure 3:
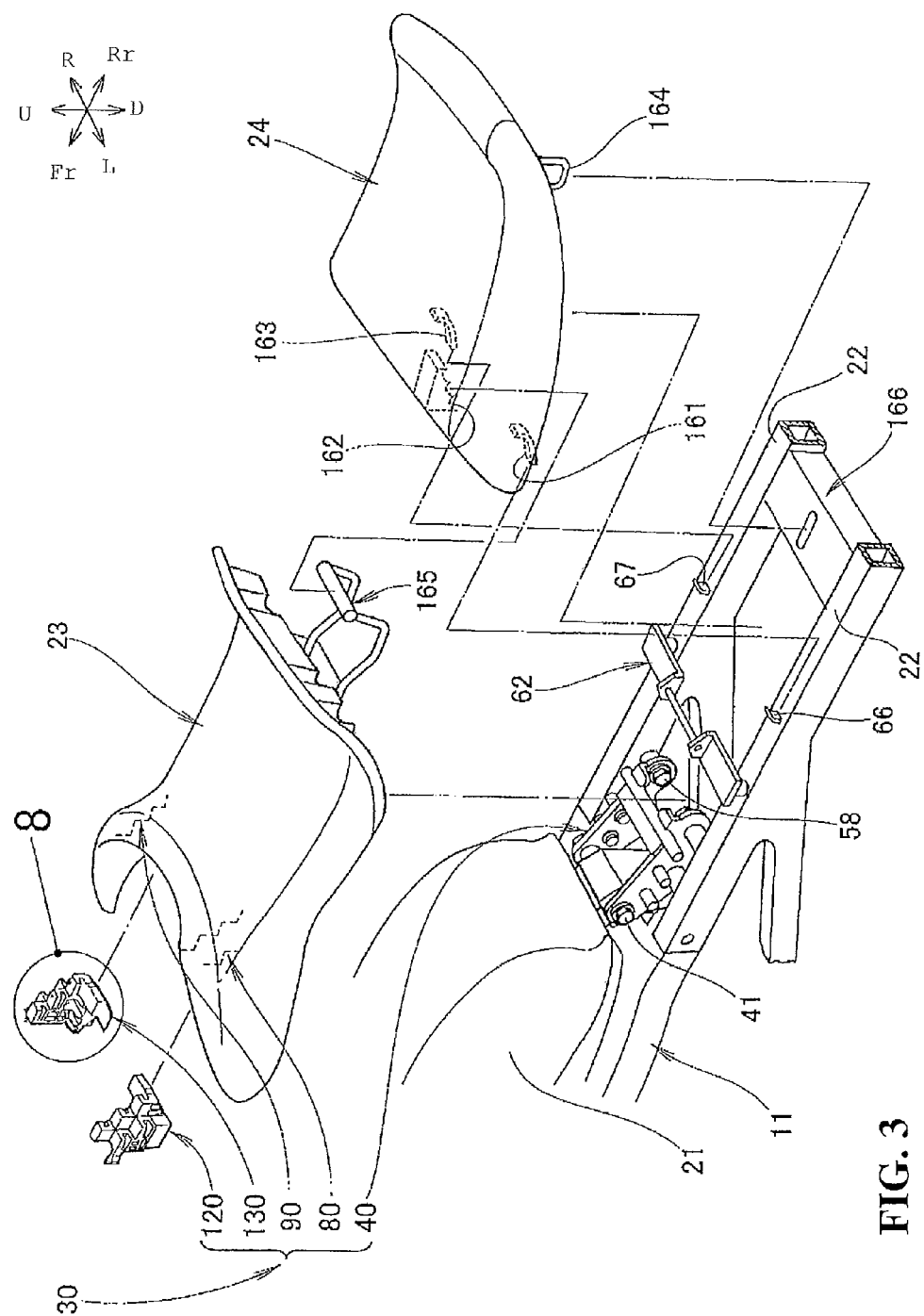
FIG. 3 is a view illustrating a procedure of assembling a driver's seat and a passenger's seat to the seat rail.

As shown in FIG. 3, the driver's seat 23 includes a left stepped portion 80 indicated by a hidden line provided on the left side of a front portion and a right stepped portion 90 (details are hereinafter described) indicated by a hidden line on the right side of the front portion. After a left adjust member 120 is attached to the left stepped portion 80 and a right adjust member 130 (details are hereinafter described) is attached to the right stepped portion 90, the driver's seat 23 is set to the seat rails 22, 22. It is to be noted that details of a setting procedure of the driver's seat 23 are hereinafter described. Now, a structure of the passenger's seat 24 is described.

The passenger's seat 24 includes a left projecting member 161 provided on the left side of a front portion of a bottom plate (hereinafter described) and projecting forwardly downwards, a setting member 162 (details are hereinafter described) provided at a central portion of the front portion of the bottom plate and formed in a stepped shape, a right projecting member 163 provided on the right side of the front portion of the bottom plate and projecting forwardly downwards, and a lock pin 164 provided at a central portion of a rear portion of the bottom plate. A procedure of setting the passenger's seat 24 to the seat rails 22, 22 is described below.

In a state wherein the driver's seat 23 is set on the seat rails 22, 22, the left projecting member 161 is engaged with the left pawl member 66 on the seat rail 22 and the right projecting member 163 is engaged with the right pawl member 67 on the seat rail 22, and the setting member 162 is fitted with a coupling member 165, which extends from a rear end of the driver's seat 23, so as to be coupled. Then, the lock pin 164 is fitted with a well-known seat lock 166 provided on the seat rails 22, 22 to set the passenger's seat 24 on the seat rails 22, 22. Now, a configuration of the seat height adjustment apparatus 30 is described.

The seat height adjustment apparatus 30 includes a left stepped portion 80 provided on the left side of the bottom plate (hereinafter described) of the driver's seat 23 and having a plurality of stages formed in a stepped configuration in the forward and backward direction of the vehicle, a right stepped portion 90 provided on the right side of the bottom plate of the driver's seat 23 and having a plurality of stages formed in a stepped configuration in the forward and backward direction of the vehicle, a left adjust member 120 removably attached to the left stepped portion 80 and having a lower portion placed on the seat rail 22 for adjusting the height of the seat rail 22 and the driver's seat 23, a right adjust member 130 removably attached to the right stepped portion 90 and having a lower face placed on the seat rail 22 for adjusting the height of the seat rail 22 and the driver's seat 23, and vehicle body side fixing means 40 provided on the seat rails 22, 22 and an abutting portion which is a portion of the left adjust member 120 and an abutting portion (details are hereinafter described) of the right adjust member 130 to fix the left adjust member 120 and the right adjust member 130. A detailed structure of the vehicle body side fixing means 40 is described below.

Figure 4:
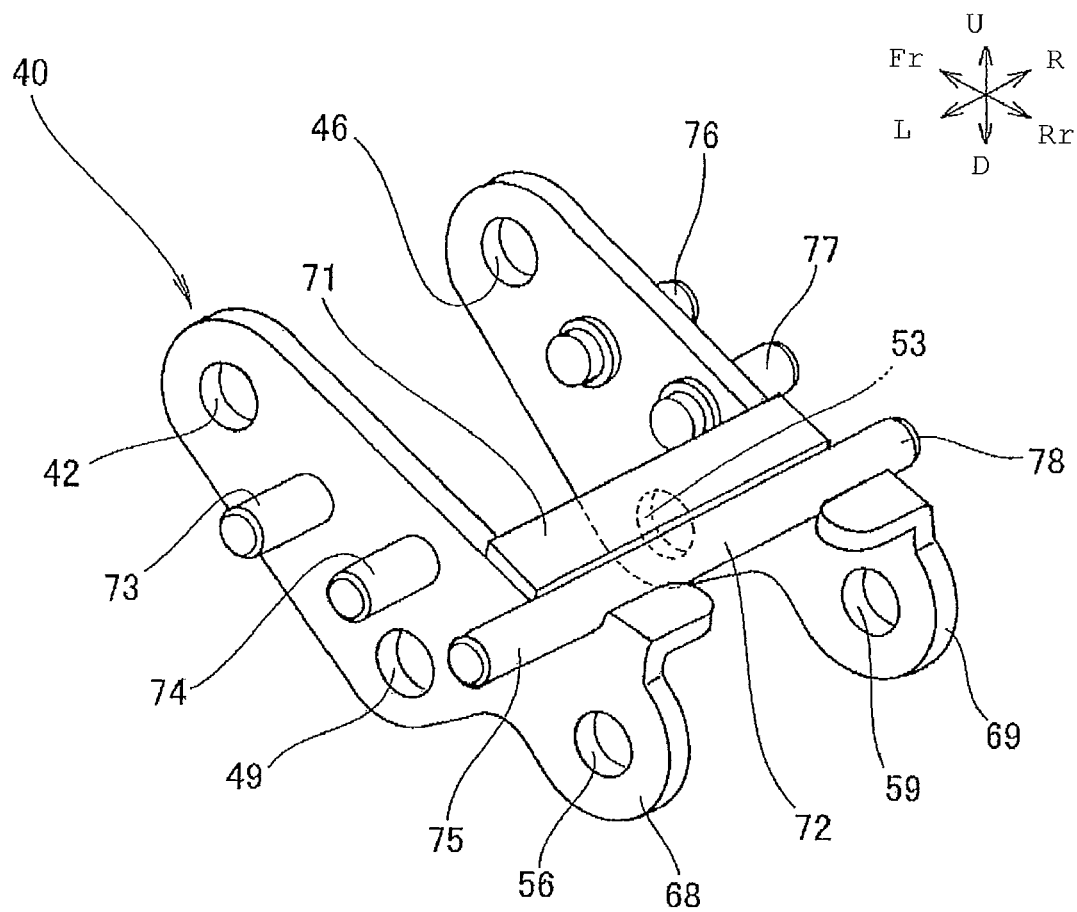
FIG. 4 is an enlarge view of a portion denoted by 4 in FIG. 2.

As shown in FIG. 4, the vehicle body side fixing means 40 includes a left extension member 68 having a left front hole 42, a left intermediate hole 49 and a left rear hole 56 and extending in the forward and backward direction, a right extension member 69 having a right front hole 46, a right intermediate hole 53 and a right rear hole 59 and extending in the forward and backward direction, and a connecting bar 72 for connecting a rear end portion of the left extension member 68 and a rear end portion of the right extension member 69 to each other together with a connecting member 71.

Further, the vehicle body side fixing means 40 includes, in addition to the components described above, a left lower position pin 73 disposed rearwardly of the left front hole 42 and projecting leftwardly from the left extension member 68 for setting the driver's seat (reference symbol 23 in FIG. 3) to a lower position, a left intermediate position pin 74 disposed rearwardly of the left lower position pin 73 and projecting leftwardly from the left extension member 68 for setting the driver's seat to an intermediate position, a left upper position pin 75 extending leftwardly from the connecting bar 72 for setting the driver's seat to an upper position, a right lower position pin 76 disposed rearwardly of the right front hole 46 and projecting rightwardly from the right extension member 69 for setting the driver's seat to the lower position, a right intermediate position pin 77 disposed rearwardly of the right lower position pin 76 and projecting rightwardly from the right extension member 69 for setting the driver's seat to the intermediate position, and a right upper position pin 78 extending rightwardly from the connecting bar 72 for setting the driver's seat to the upper position. Now, a structure of the bottom portion of the driver's seat is described.

Figure 5:
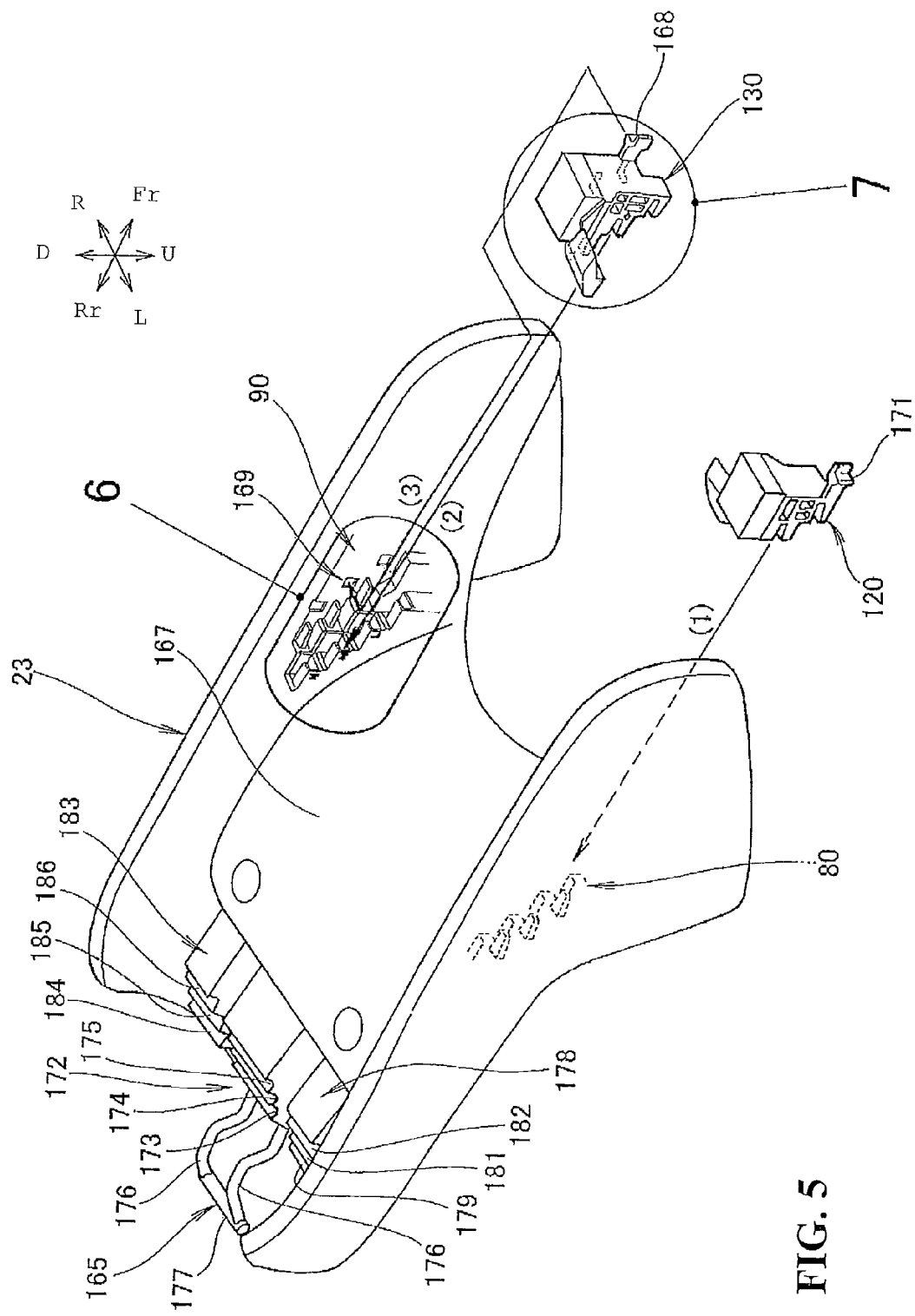
FIG. 5 is a view showing a structure of a bottom portion of the driver's seat.

As shown in FIG. 5, the left stepped portion 80 and the right stepped portion 90 paired in the left and right are provided on a bottom plate 167 of the driver's seat 23. The adjust member is formed from a left adjust member 120 and a right adjust member 130 which are removably mounted on the left stepped portion 80 and the right stepped portion 90, respectively.

The left adjust member 120 is removably attached to the left stepped portion 80 as indicated by an arrow mark (1) and the right adjust member 130 is removably attached to the right stepped portion 90 as indicated by an arrow mark (2). Further, a fixing portion 168 (details are hereinafter described) provided on the right adjust member 130 is fitted in an opening section 169 provided on the right side of a front portion of the bottom plate 167 as indicated by an arrow mark (3) to fix the right adjust member 130 to the driver's seat 23.

It is to be noted that also a fixing portion 171 of the left adjust member 120 exhibits operation similar to that of the fixing portion 168 of the right adjust member 130.

Since the left adjust member 120 and the right adjust member 130 are placed individually on the seat rails (reference symbol 22 in FIG. 3) in a state wherein they are attached to the bottom plate 167 of the driver's seat 23, they can receive the load of a person seated on the driver's seat 23 equally on the left and right. Now, a structure of a rear portion of the bottom plate 167 of the driver's seat 23 is described.

A stepped fixing member 172 (details are hereinafter described) corresponding to the left stepped portion 80 and the right stepped portion 90 is provided at a rear portion of the bottom plate 167 of the driver's seat 23, and the coupling member 165 for coupling by fitting with the setting member (reference symbol 162 of FIG. 3) provided at a front end of the passenger's seat (reference symbol 24 in FIG. 3) is provided at a rear end portion of the fixing member 172.

A lower position groove 173, an intermediate position groove 174 and an upper position groove 175 are formed in order from the rear end in a stepped configuration on the fixing member 172. Each of the lower position groove 173, intermediate position groove 174 and upper position groove 175 is formed in an arcuate shape such that it is fitted with the central support member (reference symbol 65 of FIG. 2) of the seat supporting portion (reference symbol 62 of FIG. 2).

The coupling member 165 includes two arms 176 extending rearwardly from a rear end portion of the fixing member 172 and a bar member 177 attached to a rear ends of the arms 176 for fitting with a groove (details are hereinafter described) of the setting member (reference symbol 162 of FIG. 3) of the passenger's seat (reference symbol 24 of FIG. 3).

In addition, a step member 178 is provided on the left of the fixing member 172 at a rear portion of the bottom plate 167 of the driver's seat 23, and the step member 178 has three stages of a stage 179, another stage 181 and a further stage 182 from the rear side. The stages 179, 181 and 182 are individually placed on the left support member (reference symbol 63 of FIG. 2) on the seat rail (reference symbol 22 of FIG. 2).

Further, a right step member 183 is provided on the right of the fixing member 172, and the right step member 183 has three stages of a stage 184, another stage 185 and a further stage 186 from the rear side. The stages 184, 185 and 186 are individually placed on the right support member (reference symbol 64 of FIG. 2) on the seat rail (reference symbol 22 of FIG. 2). Now, a structure of a right stepped portion 90 is described.

Figure 6:
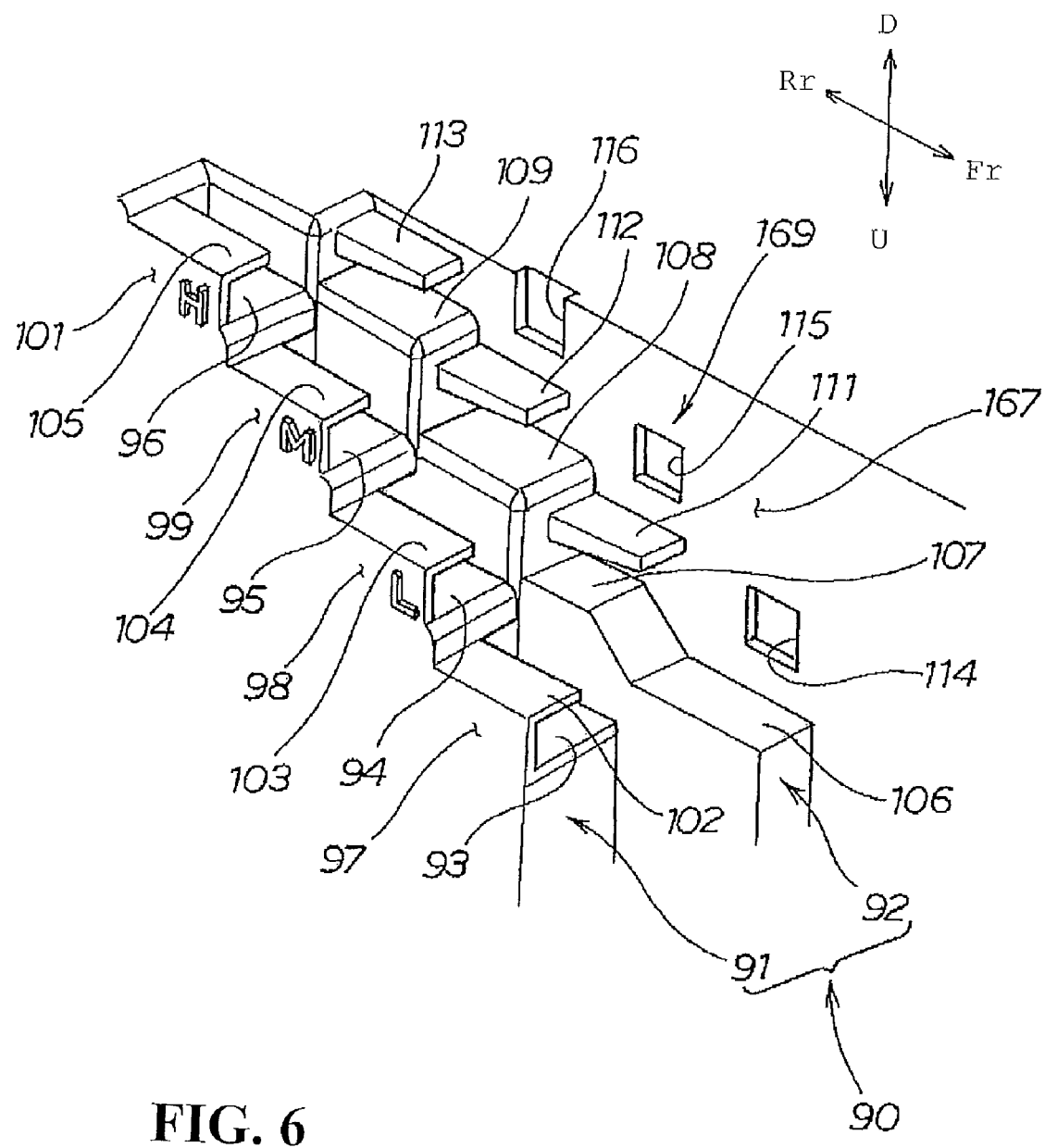
FIG. 6 is an enlarged view of a portion denoted by 6 in FIG. 5.

As shown in FIG. 6, the right stepped portion 90 is formed from two rows of stages, and one of the rows is a first step 91 disposed on the center side in the vehicle widthwise direction, and the other row is a second step 92 disposed on the outer side in the vehicle widthwise direction. Further, an opening section 169 is provided on the bottom plate 167 on the outer side with respect to the second step 92 in the vehicle widthwise direction.

The first step 91 includes four stages of a first stage 93, a second stage 94, a third stage 95 and a fourth stage 96 from the frontmost side, and an L-shaped angle is provided on each of the first stage 93, second stage 94, third stage 95 and fourth stage 96 such that it extends along the forward and backward direction of the vehicle. The four angles are an angle 97, an angle 98, an angle 99 and an angle 101 from the frontmost side. Further, a flange 102 of the angle 97, a flange 103 of the angle 98, a flange 104 of the angle 99 and a flange 105 of the angle 101 are members for fitting with a fitting portion (details are hereinafter described) of the right adjust member (reference symbol 130 of FIG. 5).

It is to be noted that the "L" formed on an outer face of the angle 98 is a mark for setting the right adjust member to the lower position. Similarly, the "M" of the angle 99 is a mark for setting the right adjust member to the intermediate position, and the "H" of the angle 101 is a mark for setting the right adjust member to the high position. Now, a structure of the second step 92 is described.

The second step 92 is formed from totaling four stages of a first stage 106, a second stage 107, a third stage 108 and a fourth stage 109 from the frontmost side. Further, a flange extending in the forward and rearward direction of the vehicle is disposed below each of the second stage 107, third stage 108 and fourth stage 109.

A flange 111 is provided on the bottom plate 167 and dispose below the second stage 107, and a flange 112 is provided on the bottom plate 167 and disposed below the third stage 108 while a flange 113 is provided on the bottom plate 167 and disposed below the fourth stage 109. The three flanges 111, 112 and 113 are members for fitting with fitting portion of the right adjust member.

The opening section 169 is formed from totaling three openings of an opening 114, another opening 115 and a further opening 116 from the frontmost side. The fixing portion (reference symbol 168 of FIG. 5) of the right adjust member (reference symbol 130 of FIG. 5) is fitted with each of the openings 114, 115 and 116. A detailed structure of the right adjust member is described with reference to FIG. 7.

Figure 7:
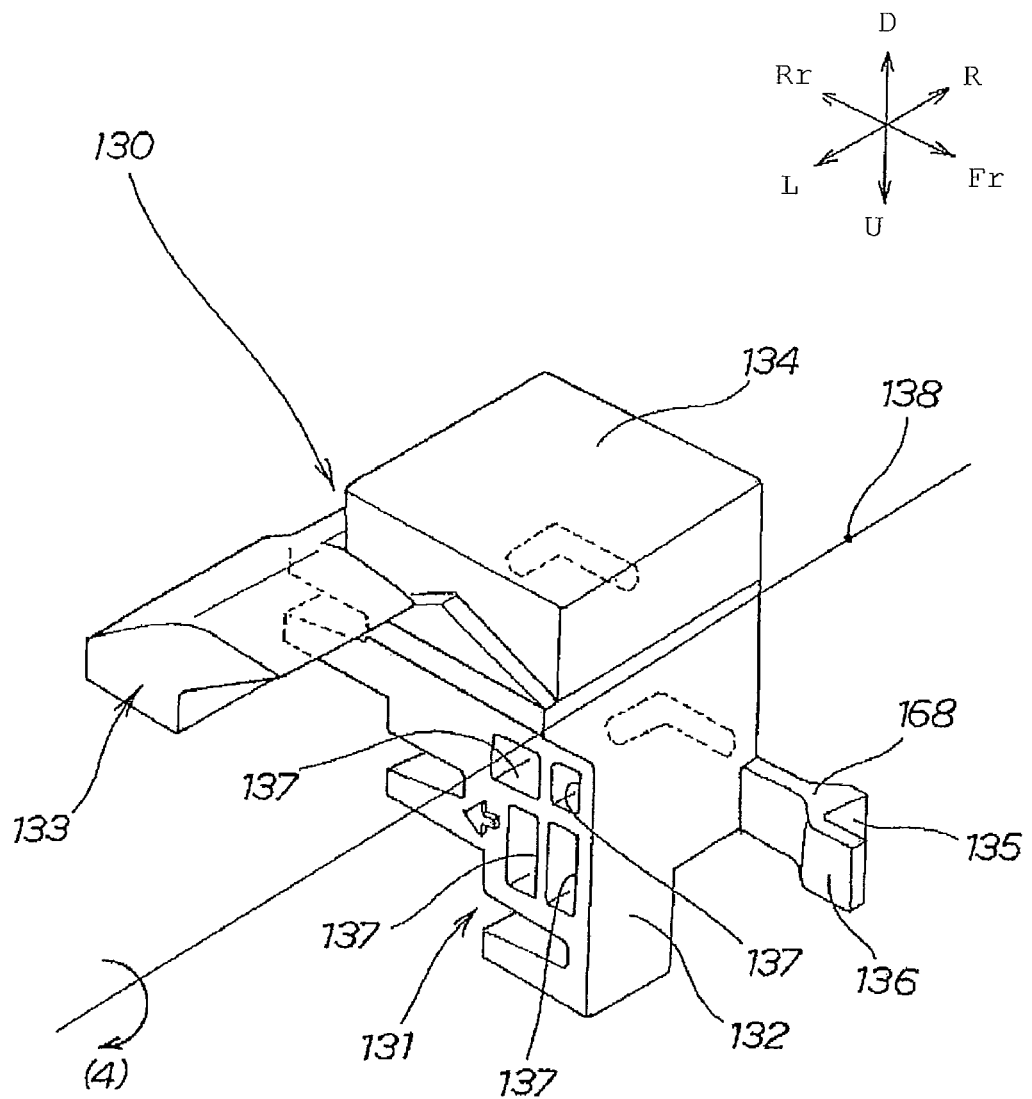
FIG. 7 is an enlarged view of a portion denoted by 7 in FIG. 5.

Referring to FIG. 7, the right adjust member 130 includes a body portion 132 having a right fitting portion 131 for fitting with the right stepped portion (reference symbol 90 of FIG. 6), a right fixing portion 168 extending forwardly from the body portion 132 for removably fitting with one of the three openings (reference symbols 114, 115 and 116 of FIG. 6) of the bottom plate (reference symbol 167 of FIG. 5) of the driver's seat (reference symbol 23 of FIG. 5) to restrict movement of the right adjust member 130, an abutting portion 133 extending from the body portion 132 side toward the center side in the vehicle widthwise direction for abutting with a pin (reference symbols 76, 77 and 78 of FIG. 4) of the vehicle body side fixing means (reference symbol 40 of FIG. 4), and an elastic member 134 provided at a lower end of the body portion 132 for contacting with the seat rail (reference symbol 22 of FIG. 3).

The fixing portion 168 includes a position fixing member 135 extending forwardly from the body portion 132 and contacting with an inner face of an opening (reference symbols 114, 115 and 116 of FIG. 6) to fix the position of the right adjust member 130, and a coming off preventing member 136 extending further forwardly from the position fixing member 135 and contacting with the bottom plate to prevent the position fixing member 135 from coming off from the opening.

It is to be noted that the elastic member 134 can reduce transmission of vibrations of the vehicle body to the driver's seat side by using either rubber, a sponge or a spring. Further, recessed portions 137 provided at four locations of the body portion 132 are provided in order to reduce the weight.

The details of the right fitting portion 131 and abutting portion 133 are hereinafter described. It is to be noted that, in FIG. 8, the right adjust member 130 is displayed in a state rotated by 180° as indicated by an arrow mark (4) around an axial line 138 of the right adjust member 130 which is a straight line extending in the vehicle widthwise direction.

Figure 8:
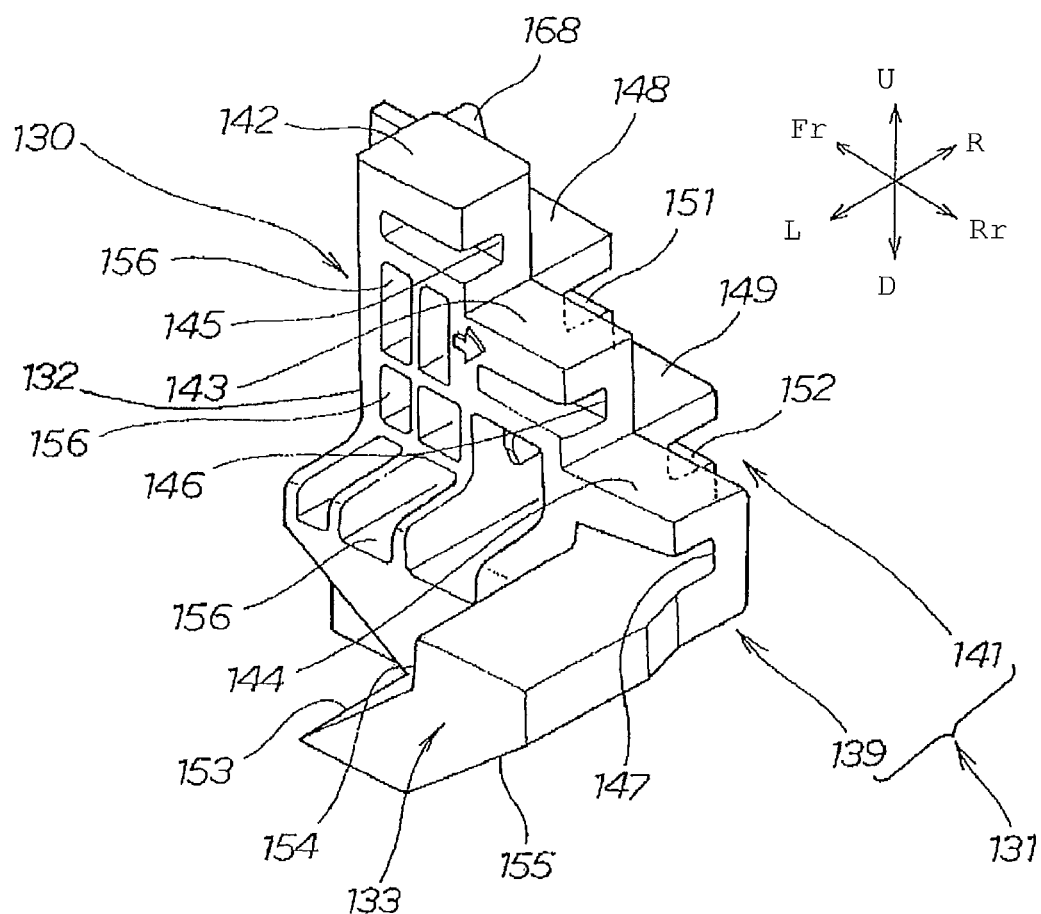
FIG. 8 is an enlarged view of a portion denoted by 8 in FIG. 3.

As shown in FIG. 8, on the right adjust member 130, the right fitting portion 131 is formed in two rows, and one of the rows is a first fitting portion 139 disposed on the center side in the vehicle widthwise direction while the other one row is a second fitting portion 141 disposed on the outer side in the vehicle widthwise direction.

The first fitting portion 139 is formed in a stepped configuration and is formed from totaling three stages of a first stage 142, a second stage 143 and a third stage 144 from the uppermost side. A groove is formed on each of the first stage 142, second stage 143 and third stage 144 such that it extends along the forward and backward direction of the vehicle. The three grooves are a groove 145, another groove 146 and a further groove 147 from the uppermost side.

The second fitting portion 141 is formed in a stepped configuration similarly to the first fitting portion 139 and is formed from totaling two stages of a first stage 148 and a second stage 149 from the uppermost side. A groove is formed on each of the first stage 148 and the second stage 149 such that it extends along the forward and backward direction of the vehicle. The two grooves are a groove 151 and another groove 152 from the uppermost side.

The right adjust member 130 has a right fitting portion 131 for fitting with the right stepped portion (reference symbol 90 of FIG. 6), and a right fixing portion 168 (for details, refer to FIG. 7) for removably fitting with the driver's seat (reference symbol 23 of FIG. 5) to restrict movement of the adjust member 130. When the adjust member 130 is attached to the driver's seat, since the right fitting portion 131 is fitted with the right stepped portion, the attachment of the right adjust member 130 is smoothened. Further, since the right fixing portion 168 is fitted with the driver's seat side, it can be confirmed readily that the right adjust member 130 has been fixed to the driver's seat successfully.

In addition, the adjust member 130 includes an abutting portion 133 extending from the body portion 132 toward the center side in the vehicle widthwise direction. This abutting portion 133 includes a contacting face 153 wherein a pin (reference symbol 76, 77 or 78 of FIG. 4) of the vehicle body side fixing means contacts when the right adjust member 130 and is attached to the vehicle body side fixing means (reference symbol 40 of FIG. 4). An abutting face 154 is disposed above the contacting face 153 for abutting with the pin of the vehicle body side fixing means. An erroneous assembly preventing member 155 is disposed rearwardly of the contacting face 153 and the abutting face 154 for preventing the pin of the vehicle body side fixing means from contacting with the abutting face 154.

Although the erroneous assembly preventing member 155 is a member for preventing the right adjust member 130 from being assembled in error to the vehicle body side fixing means (details are hereinafter described), it exhibits also a function (details are hereinafter described) of attaching the right adjust member 130 smoothly to the vehicle body side fixing means.

It is to be noted that recessed portions 156 provided at seven locations of the body portion 132 are provided in order to reduce the weight. The following is an example of a procedure for attaching an adjust member to a stepped portion.

Figure 9:
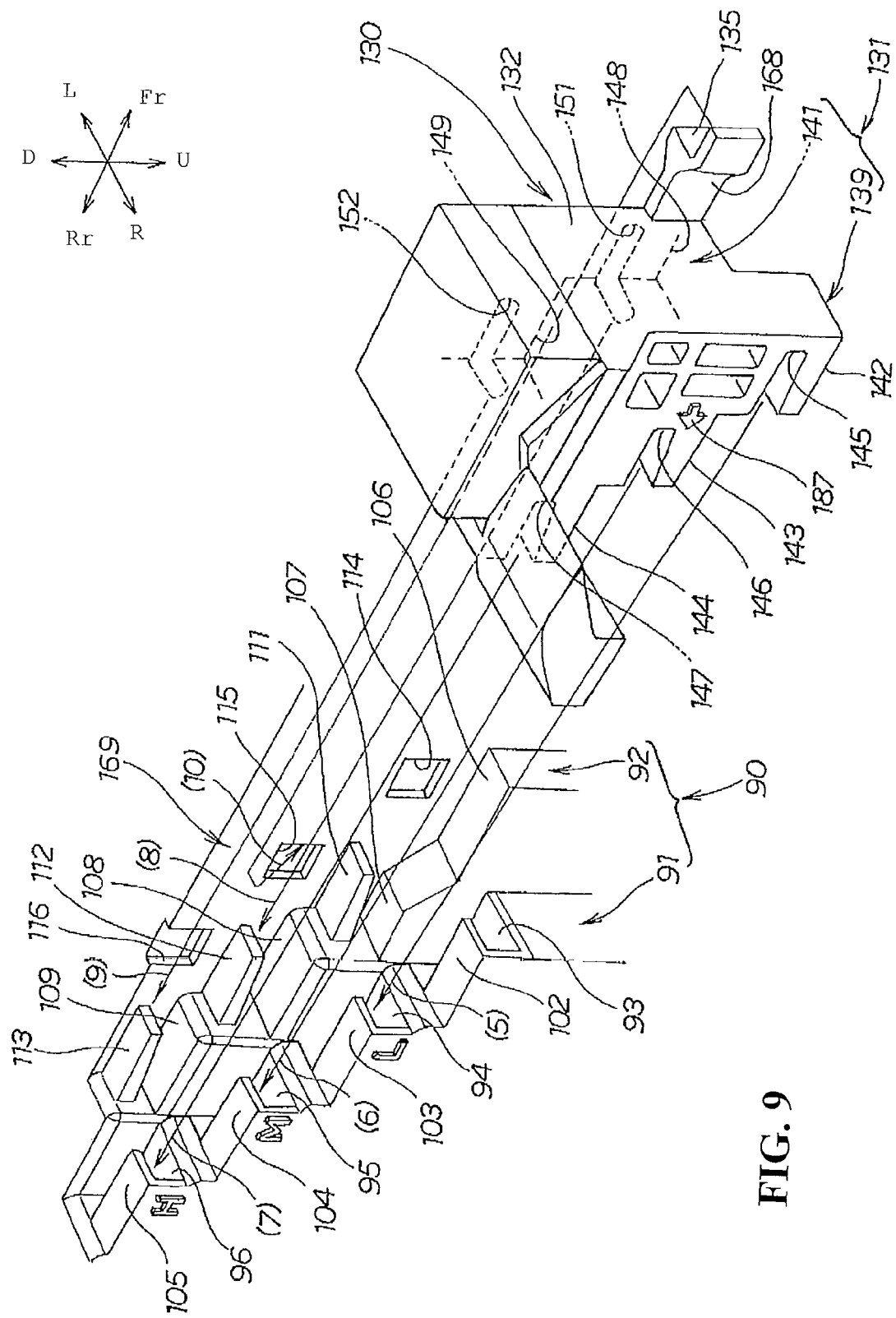
FIG. 9 is a view illustrating a procedure of attaching an adjust member to a stepped portion.

As shown in FIG. 9, in order to set the right adjust member 130 to an intermediate position of the right stepped portion 90 and opening section 169 indicated by the mark "M," an arrow mark 187 formed on the body portion 132 is directed toward the mark "M." Particular operation of fitting the right adjust member 130 into the right stepped portion 90 and opening section 169 is such as described below.

The groove 145 of the first stage 142 is fitted with the flange 103 of the second stage 94 as indicated by an arrow mark (5), and the groove 146 of the second stage 143 is fitted with the flange 104 of the third stage 95 as indicated by an arrow mark (6). Further, the groove 147 of the third stage 144 is fitted with the flange 105 of the fourth stage 96 as indicated by an arrow mark (7), and the groove 151 of the first stage 148 is fitted with the flange 112 of the third stage 108 as indicated by an arrow mark (8). Furthermore, the groove 152 of the second stage 149 is fitted with the flange 113 of the fourth stage 109 as indicated by an arrow mark (9), and the position fixing member 135 of the fixing portion 168 is fitted into the opening 115 of the opening section 169 as indicated by an arrow mark (10).

Since the arrow mark 187 and the mark (M) are used to fit the right adjust member 130 with the right stepped portion 90 and opening section 169, the fitting operation is smoothened.

If the arrow mark 187 is adjusted to the mark "L," then the right adjust member 130 is set to the low position, but if the arrow mark 187 is adjusted to the mark "H," then the right adjust member 130 is set to the high position.

It is to be noted that the groove 145 of the first stage 142 can be fitted with the flange 102 of the first stage 93 and the groove 151 of the first stage 148 can be fitted with the flange 111 of the second stage 107 while the position fixing member 135 of the fixing portion 168 can be fitted with the opening 114 and the opening 116 of the opening section 169.

In addition, the right stepped portion 90 and the right fitting portion 131 are each formed in two rows. Therefore, the coupling between the driver's seat (reference symbol 23 of FIG. 5) and the right adjust member 130 can be further strengthened.

Operation of the seat height adjustment apparatus described above is described below.

It is to be noted that, in the following description, only the right stepped portion 90 and the right adjust member 130 are described for the convenience of description. However, also the left stepped portion (reference symbol 80 of FIG. 5) and the left adjust member (reference symbol 120 of FIG. 5) exhibit similar operation to that of the right stepped portion 90 and the right adjust member 130.

Figure 10A:
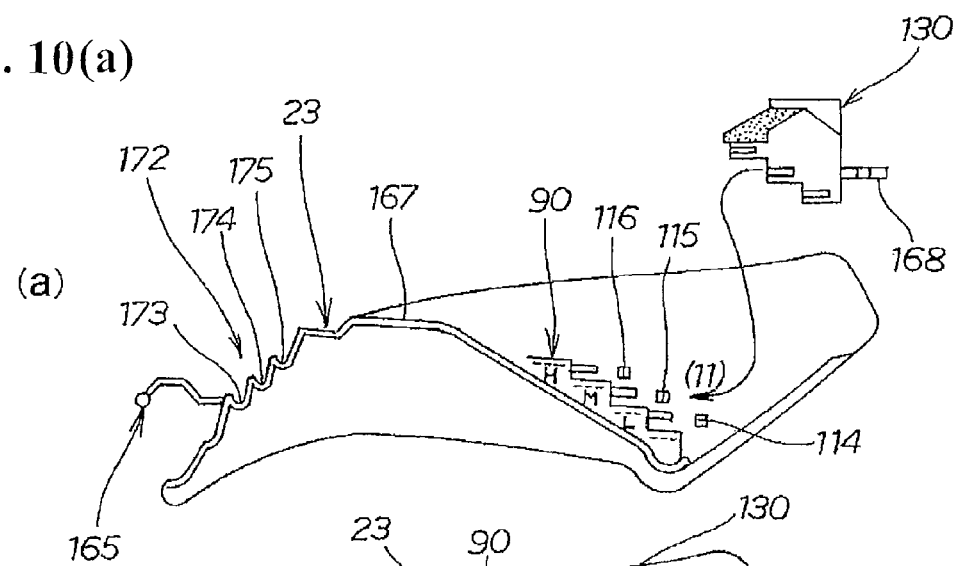
FIGS. 10(a) to 10(d) are views illustrating three assembling forms of an adjust member to the stepped portion.

Referring to FIGS. 10(a) to 10(d), the adjust member 130 is directed toward the stepped portion 90 as indicated by an arrow mark (11) as shown in FIG. 10(a).

Figure 10B:
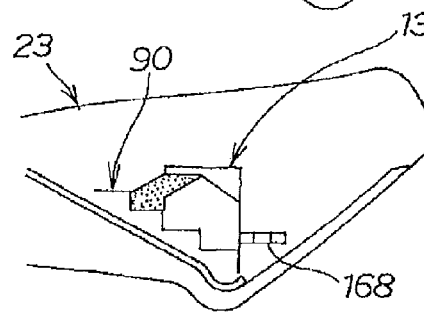
Figure 10C:
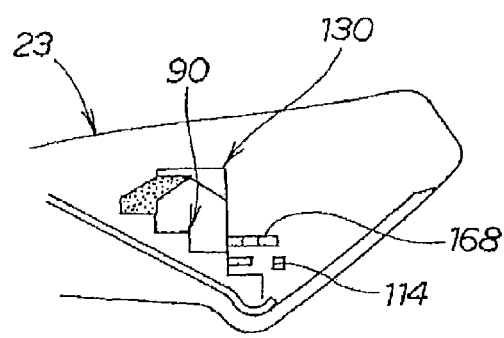
Figure 10D:
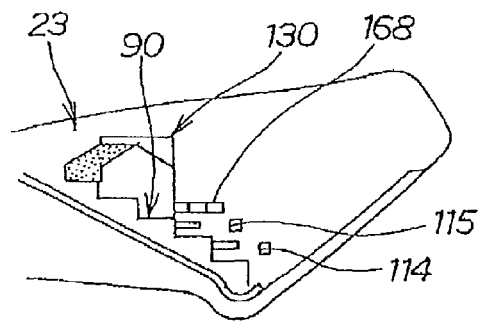

At this time, if the low position of the right stepped portion 90 is selected, then the adjust member 130 is disposed at the low position as shown in FIG. 10(b), but if the intermediate position of the right stepped portion 90 is selected, then the adjust member 130 is disposed at the intermediate position. However, if the high position of the right stepped portion 90 is selected, then the adjust member 130 is disposed at the high position as shown in FIG. 10(d). Now, the operation until the driver's seat 23 is set to the low position is described.

Figure 11A:
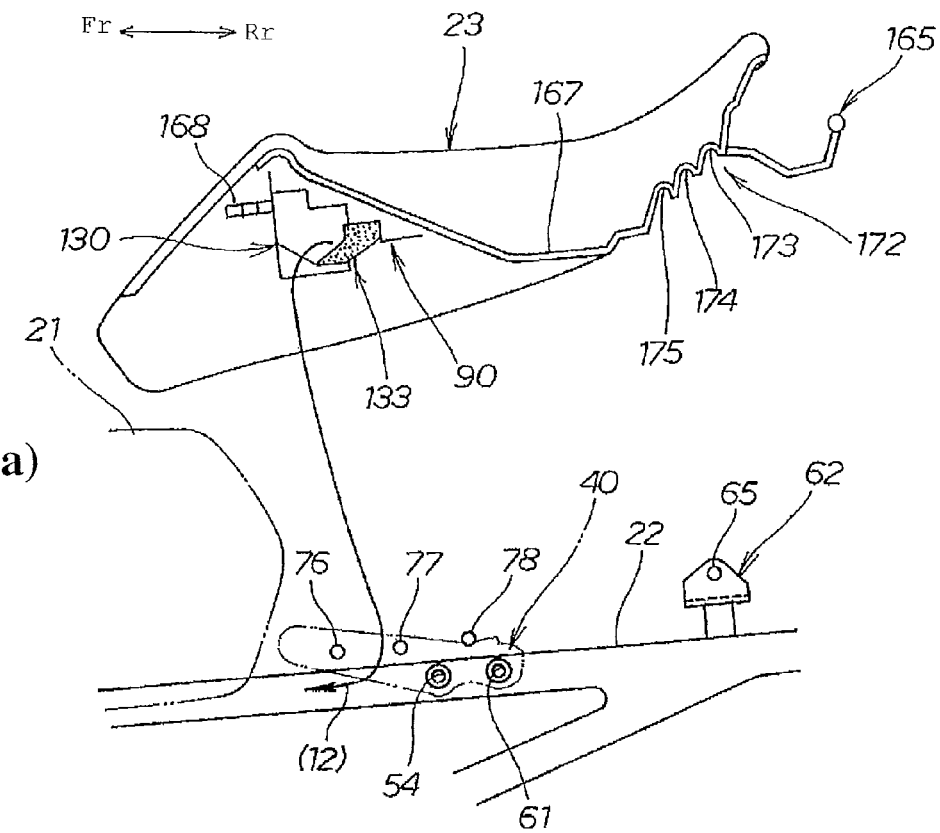
FIGS. 11(a) and 11(b) are views illustrating the operation before the driver's seat set to a low position.
Figure 11B:
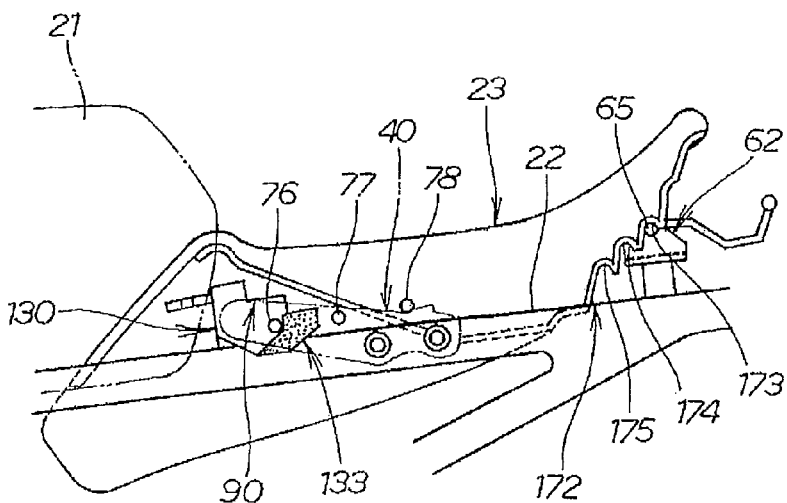

Referring to FIGS. 11(a) and 11(b), the abutting portion 133 of the adjust member 130, set to the low position of the right stepped portion 90, is inserted between the lower position pin 76 and the intermediate position pin 77 as indicated by an arrow mark (12) as shown in FIG. 11(a).

In FIG. 11(b), since the abutting portion 133 of the adjust member 130 is in an abutting state with the lower position pin 76 and simultaneously the lower position groove 173 of the fixing member 172 is fitted with the central supporting member 65 of the seat supporting member 62, the driver's seat 23 is at the low position. The operation until driver's seat 23 is set to the intermediate position is hereinafter described.

Figure 12A:
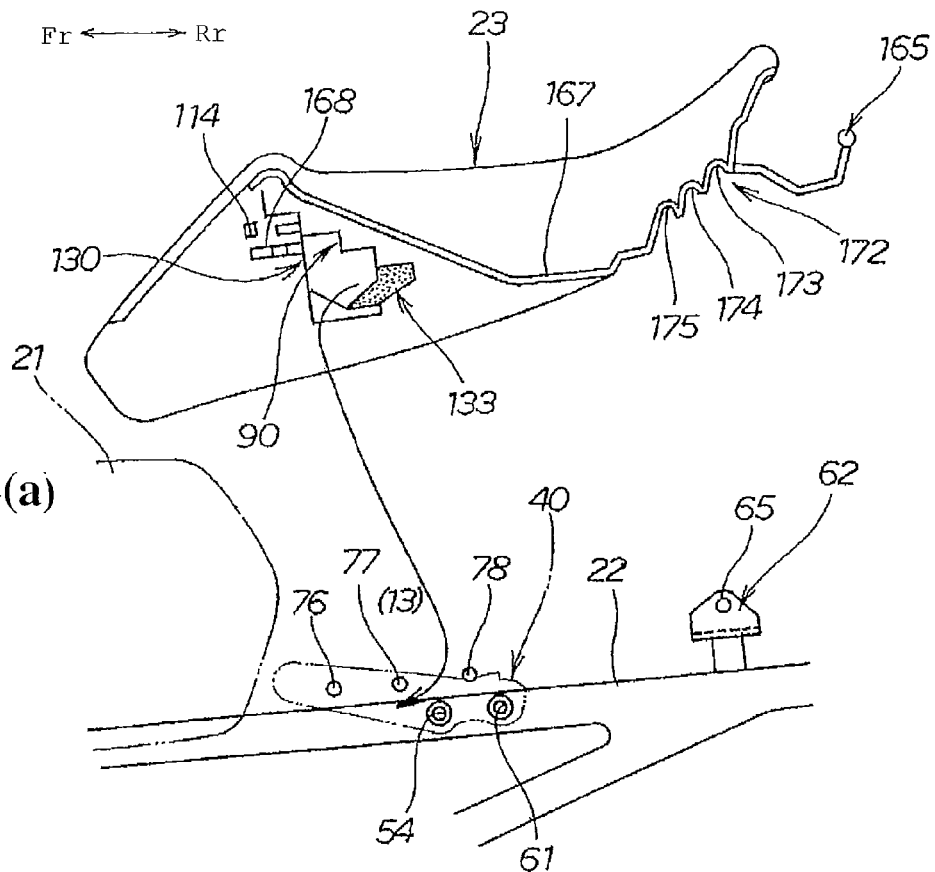
FIGS. 12(a) and 12(b) are views illustrating the operation before the driver's seat set to an intermediate position.

Referring to FIG. 12(a), the abutting portion 133 of the adjust member 130, set to the intermediate position of the right stepped portion 90, is inserted between the intermediate position pin 77 and the upper position pin 78 as indicated by an arrow mark (13).

Figure 12B:
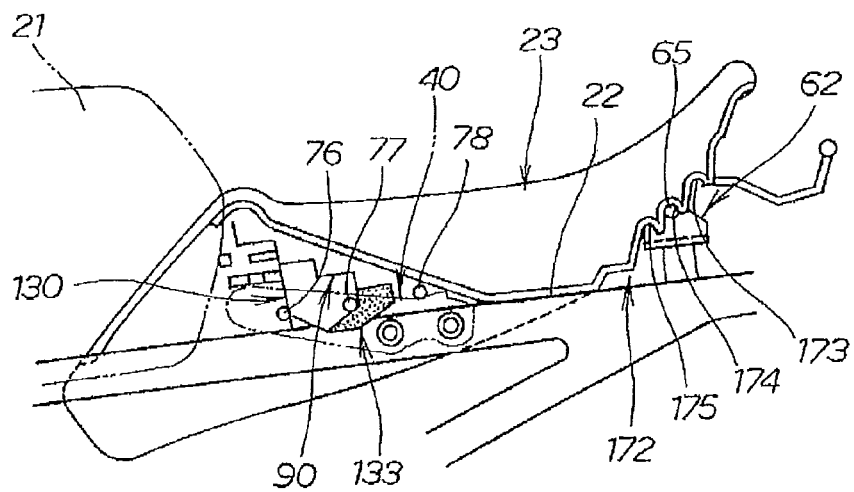

Since, in FIG. 12(b), the abutting portion 133 of the adjust member 130 is in an abutting state with the intermediate position pin 77 and simultaneously the intermediate position groove 174 of the fixing member 172 is fitted with the central supporting member 65 of the seat supporting member 62, the driver's seat 23 is at the intermediate position. The operation until the driver's seat 23 is set to the high position is hereinafter described.

Figure 13A:
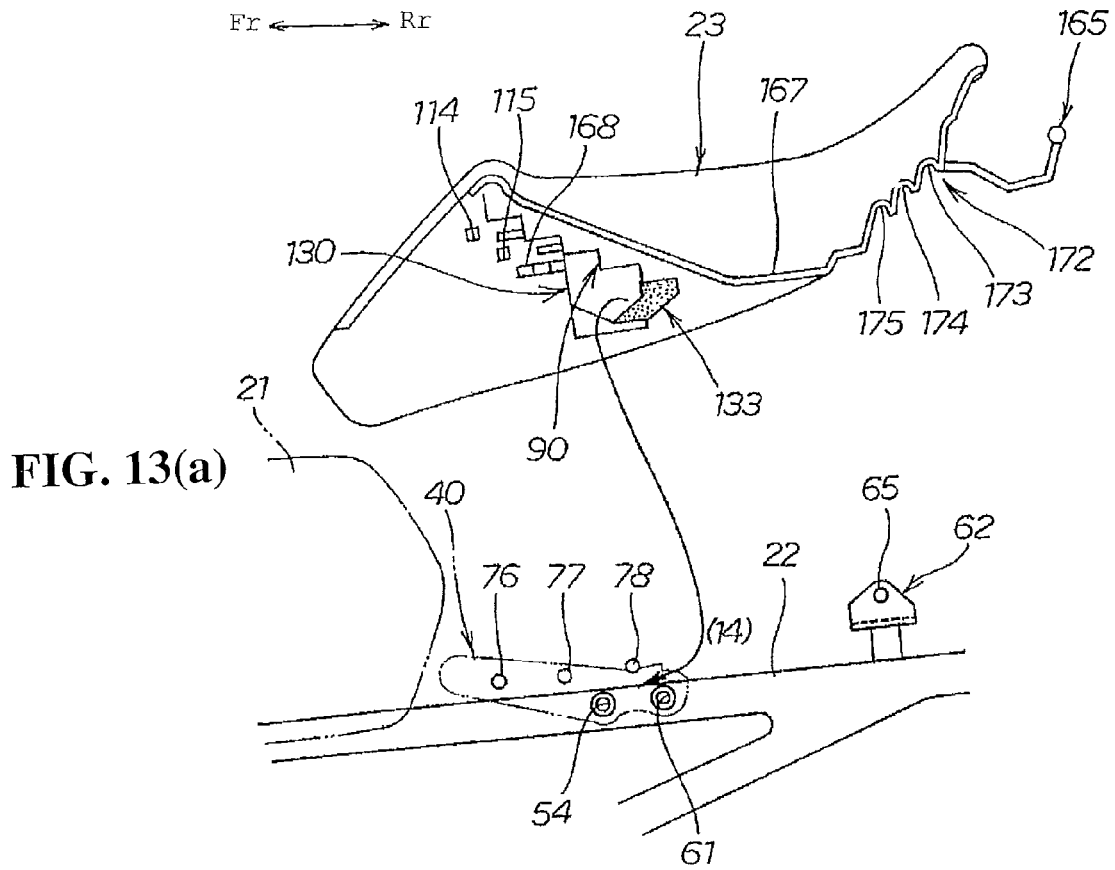
FIGS. 13(a) and 13(b) are views illustrating the operation before the driver's seat is set to a high position.

Referring to FIG. 13(a), the abutting portion 133 of the adjust member 130 set to the high position of the right stepped portion 90 is directed toward the upper position pin 78 as indicated by an arrow mark (14).

Figure 13B:
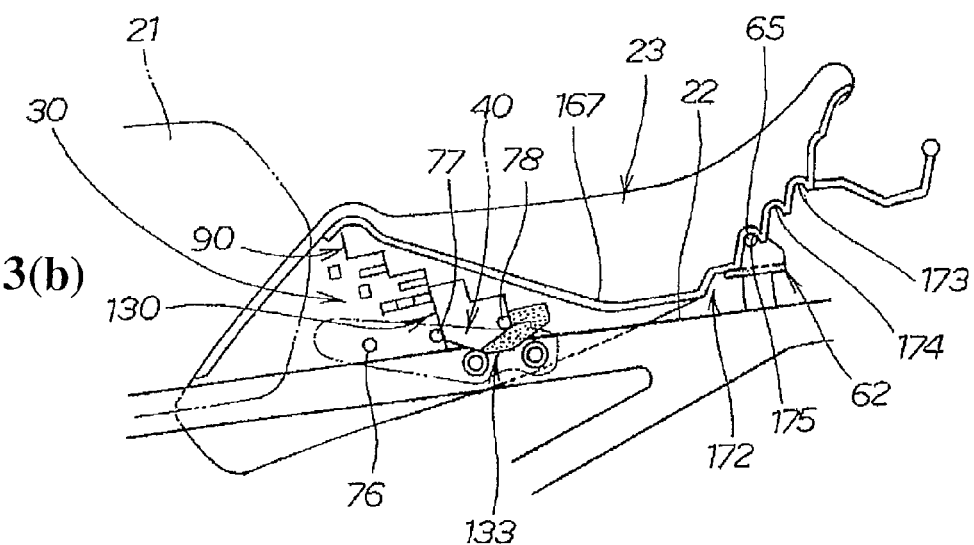

Since, in FIG. 13(b), the abutting portion 133 of the adjust member 130 is in an abutting state with the upper position pin 78 and simultaneously the upper position groove 175 of the fixing member 172 is fitted with the central supporting member 65 of the seat supporting member 62, the driver's seat 23 is at the high position.

The adjust member 130 is disposed between the right stepped portion 90 provided on the bottom plate 167 of the driver's seat 23 and the seat rail 22 and is fixed through the abutting portion 133 abutting with the vehicle body side fixing means 40 provided on the seat rail 22 and is removably attached to the right stepped portion 90. Since the adjust member 130 is removably attached to the right stepped portion 90, the adjust member 130 can be replaced to an arbitrary stage of the right stepped portion 90.

If the replacement of the adjust member 130 is carried out, then since the position of the adjust member 130 in the heightwise direction of the vehicle with respect to the driver's seat 23 is changed, the height of the driver's seat 23 when the adjust member 130 is placed on the seat rail 22 can be changed. Accordingly, when it is desired to change the height of the driver's seat 23, the height of the driver's seat 23 can be adjusted simply only by replacing the adjust member 130 to an arbitrary stage of the right stepped portion 90.

Further, with the seat height adjustment apparatus 30, since the height of the driver's seat 23 can be adjusted by the stepped portion 90, adjust member 130 and vehicle body side fixing means 40, reduction of the number of parts can be achieved in comparison with a complicated apparatus which includes a great number of parts.

Accordingly, the seat height adjustment apparatus 30 which can reduce the number of parts and can adjust the height of the driver's seat 23 can be provided. The operation until the abutting face of the adjust member is brought into abutment with the pin of the vehicle body side fixing means is hereinafter described.

Figure 14A:
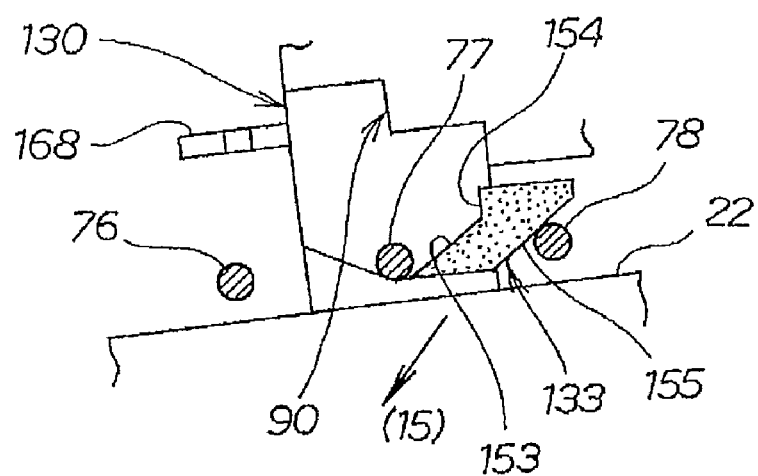
FIGS. 14(a) and 14(b) are views illustrating the operation before an abutting face of the adjust member is brought into abutment with a pin of the vehicle body side fixation means.

Referring to FIG. 14(a), the abutting portion 133 of the adjust member 130 is disposed between the intermediate position pin 77 and the upper position pin 78 and the contacting face 153 of the abutting portion 133 contacts with the intermediate position pin 77 while the erroneous assembly preventing member 155 of the abutting portion 133 contacts with the upper position pin 78. From this state, the adjust member 130 is pushed downwardly as indicated by an arrow mark (15).

Figure 14B:
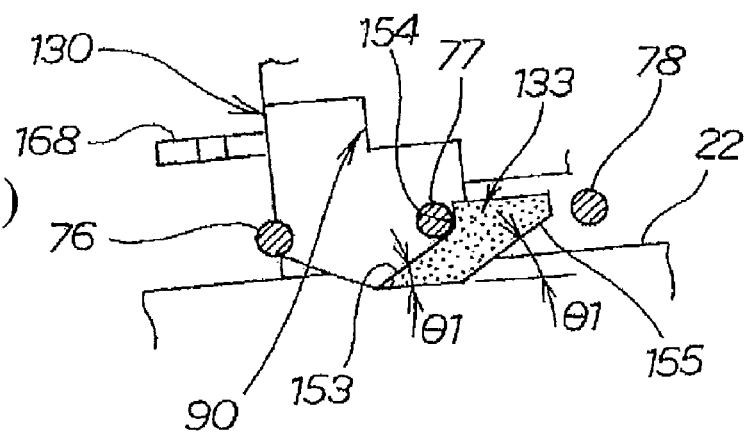

As shown in FIG. 14(b), the abutting face 154 of the adjust member 130 is in an abutting state with the intermediate position pin 77. The setting of the adjust member 130 to the vehicle body side fixing means (reference symbol 40 of FIG. 4) is completed therewith.

In the adjust member 130, since the contacting face 153 of the abutting portion 133 and the erroneous assembly preventing member 155 of the abutting portion 133 are formed such that they are inclined downwardly from the rear to the front at an inclination angle θ1, the adjust member 130 can be set smoothly to the vehicle body side fixing means.

While it is described in the foregoing description that the erroneous assembly preventing member 155 exhibits a function of attaching the adjust member 130 to the vehicle body side fixing means smoothly, the erroneous assembly preventing member 155 has also a function of preventing the adjust member 130 from being assembled in error to the vehicle body side fixing means. The erroneous assembly preventing function of the erroneous assembly preventing member 155 is hereinafter described.

Referring to FIG. 15(a), the right adjust member 130 is set to the low position on the right stepped portion 90 of the driver's seat 23.

At this time, if the intermediate position groove 174 of the fixing member 172 of the driver's seat 23 is directed in error toward the central supporting member 65 of the seat supporting member 62 as indicated by an arrow mark (16), then as shown in FIG. 14(b), the intermediate position groove 174 is fitted with the central supporting member 65 and the erroneous assembly preventing member 155 of the adjust member 130 is placed on the intermediate position pin 77 of the vehicle body side fixing means 40.

In particular, the erroneous assembly preventing member 155 which disables the abutting portion 133 of the adjust member 130 from fitting with the vehicle body side fixing means 40 when the abutting portion 133 of the adjust member 130 is assembled in error to the vehicle body side fixing means 40 by setting the adjust member 130 to the low position and setting the intermediate position groove 174 in error to the central supporting member 65 is provided between the adjust member 130 and the vehicle body side fixing means 40. Erroneous assembly of the adjust member 130 to the vehicle body side fixing means 40 can be prevented by the erroneous assembly preventing member 155.

In addition, in the motorcycle (reference symbol 10 of FIG. 1) of the present invention, the passenger's seat is disposed rearwardly of the driver's seat. Operation until the passenger's seat is attached to the seat rails is described with reference to FIGS. 16(a) and 16(b).

Figures 16A, 16B:
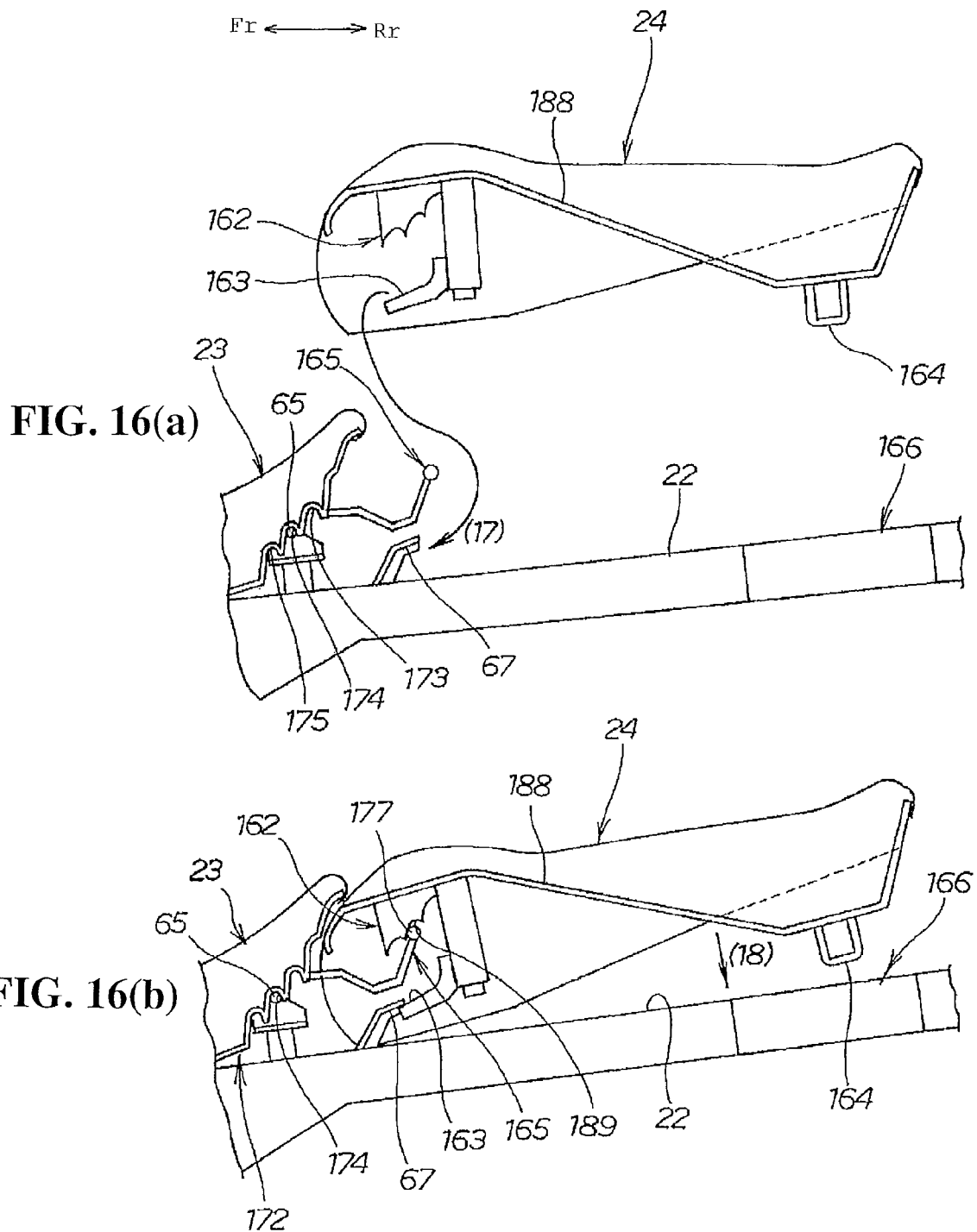
FIGS. 16(a) and 16(b) are views illustrating the operation before the passenger's seat is attached to the seat rail.

Referring to FIG. 16(a), the driver's seat 23 is set to the intermediate position, and the right projecting member 163 provided on a bottom plate 188 of the passenger's seat 24 is directed toward the right pawl member 67 on the seat rail 22 as indicated by an arrow mark (17).

As shown in FIG. 16(b), the right projecting member 163 is engaged with the right pawl member 67 and the setting member 162 provided on the bottom plate 188 of the passenger's seat 24 is fitted with the coupling member 165 of the driver's seat 23 to couple the setting member 162 to the driver's seat 23 and the passenger's seat 24 is lowered as indicated by an arrow mark (18). At this time, the bar member 177 of the coupling member 165 is in a state fitted in an intermediate position groove 189 of the setting member 162.

It is to be noted that, while, in the embodiment, only the right projecting member 163 and the right pawl member 67 are shown for the convenience of description, also the left projecting member (reference symbol 161 of FIG. 3) and the left pawl member (reference symbol 66 of FIG. 3) exhibit A similar operation to that of the right projecting member 163 and the right pawl member 67.

Referring to FIG. 17(a), the passenger's seat 24 is set on the seat rail 22 and the driver's seat 23 is set to the intermediate position.

At this time, if the height from the surface of the seat rail 22 to the bottom plate 188 of the passenger's seat 24 is Ha, then Ha=hc+h1+h2. In FIG. 17(a), hc is the height from the surface of the seat rail 22 to the central supporting member 65, and this height is always fixed. In FIG. 17(a), h1 represents the height from the central supporting member 65 to the bar member 177 of the coupling member 165, and h2 represents the height from the bar member 177 to the bottom plate 188 of the passenger's seat 24. Now, a height relationship between the passenger's seat 24 and the driver's seat 23 is described.

As shown in FIG. 17(b), the passenger's seat 24 is set on the seat rail 22, and the driver's seat 23 is set to the high position. At this time, the bar member 177 of the coupling member 165 is fitted with a high position groove 191 of the setting member 162.

If the height from the surface of the seat rail 22 to the bottom plate 188 of the passenger's seat 24 is represented by Hb, then Hb=hc+h3+h4. In FIG. 17(b), h3 represents the height from the central supporting member 65 to the bar member 177, and h4 represents the height from the bar member 177 to the bottom plate 188. Now, a height relationship between the passenger's seat 24 and the driver's seat 23 at the low position is described.

As shown FIG. 17(c), the passenger's seat 24 is set on the seat rail 22, and the driver's seat 23 is set to the low position. At this time, the bar member 177 of the coupling member 165 is fitted in a low position groove 192 of the setting member 162.

If the height from the surface of the seat rail 22 to the bottom plate 188 of the passenger's seat 24 is represented by Hc, then Hc=hc+h5+h6. In FIG. 17(c), h5 represents the height from the central supporting member 65 to the bar member 177, and h6 represents the height from the bar member 177 to the bottom plate 188.

The passenger's seat 24 includes the setting member 162 at a front end of the bottom plate 188, and the setting member 162 is formed in a stepped configuration so as to correspond to the positions (low position, intermediate position and high position) of the driver's seat 23. Since the low position groove 192, intermediate position groove 189 and high position groove 191 are formed from the front side on the setting member 162, even if the height of the bar member 177 of the coupling member 165 varies as a result of a change in the position (low position, intermediate position or high position) of the driver's seat 23, the height from the surface of the seat rail 22 to the bottom plate 188 of the passenger's seat 24 can be fixed. In other words, the height Ha shown in FIG. 17(a), the height Hb shown in FIG. 17(b) and the height Hc shown in FIG. 17(c) become all equal to each other.

In addition, the fixing member 172 corresponding to the left stepped portion (reference symbol 80 of FIG. 5) and the right stepped portion (reference symbol 90 of FIG. 5) is provided on the bottom plate (reference symbol 167 of FIG. 5) at a rear portion of the driver's seat 23, and the coupling member 165 for coupling the fixing member 172 to the setting member 162 provided at a front end of the passenger's seat 24 is provided at a rear end portion of the fixing member 172.

By the combination of the coupling member 165 of the driver's seat 23 and the setting member 162 of the passenger's seat 24, when the driver's seat 23 is moved in the forward or backward direction of the vehicle, the rear end portion of the driver's seat 23 and the front end of the passenger's seat 24 can be fixed in accordance with the movement of the driver's seat 23.

It is to be noted that, while the number of stages of the stepped portions according to the present invention is four in the embodiment, the number of stages may be determined arbitrarily.

In addition, while the abutting portion for abutting with the pin of the vehicle body side fixing means in the embodiment is applied as part of the adjust member according to the present invention, a fork-shaped member for sandwiching the pin may be applied.

Further, while the vehicle body side fixing means according to the present invention is configured in the embodiment such that the height of the driver's seat is changed by the three pins, it may have another configuration which includes a stepped opening with which part of the adjust member is to be fitted.

Further, while the fitting portion of the adjust member according to the present invention is formed from a plurality of recessed portions in the embodiment, it may be formed from a plurality of projections. Where the fitting portion is formed from a plurality of projections, naturally the stepped portions provided on the bottom plate of the driver's seat are formed from a plurality of recessed portions.

Further, while the adjust member according to the present invention is configured in the embodiment such that the left adjust member and the right adjust member are attached to the left side and the right side of the driver's seat, it may be attached to one of the left side and the right side of the driver's seat.

The seat height adjustment apparatus of the present invention is suitable for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat height adjustment apparatus for a motorcycle for adjusting a height of a driver's seat, comprising:
    a stepped portion provided on a bottom plate of the driver's seat and having a plurality of stages formed in a stepped configuration in a forward and backward direction of a vehicle;
    an adjust member removably attached to said stepped portion and having a lower face placed on a seat rail for adjusting a height between the seat rail and the driver's seat; and
    vehicle body side fixing means provided on the seat rail for abutting with part of said adjust member to fix said adjust member.

2. The seat height adjustment apparatus for the motorcycle according to claim 1, wherein said adjust member has a fitting portion for fitting with said stepped portion, and a fixing portion for removably fitting with the driver's seat side to restrict movement of said adjust member.

3. The seat height adjustment apparatus for the motorcycle according to claim 2, wherein each of said stepped portion and said fitting portion is formed in two rows.

4. The seat height adjustment apparatus for the motorcycle according to claim 1, wherein an erroneous assembly preventing member for disabling part of said adjust member from fitting with said vehicle body side fixing means when the part of said adjust member is assembled in error to said vehicle body side fixing means is provided between said adjust member and said vehicle body side fixing means.

5. The seat height adjustment apparatus for the motorcycle according to claim 1, wherein where the motorcycle includes a passenger's seat disposed rearwardly of the driver's seat, a stepped fixing member corresponding to said stepped portion is provided on the bottom plate at a rear portion of the driver's seat, and a coupling member for coupling the fixing member to a front end of the passenger's seat is provided at a rear end portion of said fixing member.

6. The seat height adjustment apparatus for the motorcycle according to claim 1, wherein said vehicle body side fixing means is fastened to a vehicle body frame together with a fuel tank.

7. The seat height adjustment apparatus for the motorcycle according to claim 1, wherein said adjust member is formed from a left adjust member and a right adjust member removably mounted on a left stepped portion and a right stepped portion which are provided in a left and right pair on the bottom plate of the driver's seat.

8. The seat height adjustment apparatus for the motorcycle according to claim 1, wherein three stepped portions are mounted relative to each side of the driver's seat for enabling three distinct positions of the height of the driver's seat.

9. The seat height adjustment apparatus for the motorcycle according to claim 1, wherein the adjusting member includes an abutting portion, said abutting portion including a contacting face and an abutting face for mating with the fixing means for fixing the adjusting member.

10. The seat height adjustment apparatus for the motorcycle according to claim 1, and further including a central support member for engaging a rear portion of a driver's seat in one of a plurality of locations for fixing the height of the rear portion of the driver's seat depending on the adjustment of the height of a front portion of the driver's seat.

11. A seat height adjustment apparatus adapted for use with a motorcycle for adjusting a height of a driver's seat, comprising:
    a stepped portion provided on a bottom plate of the driver's seat, said stepped portion having a plurality of stages formed in a stepped configuration in a forward and rearward direction;
    an adjust member removably attached to said stepped portion and having a lower face placed on a seat rail for adjusting a height between the seat rail and the driver's seat; and
    a fixing member provided on the seat rail for abutting with part of said adjust member to fix said driver's seat at a predetermined height relative to said seat rail.

12. The seat height adjustment apparatus adapted for use with a motorcycle according to claim 11, wherein said adjust member has a fitting portion for fitting with said stepped portion, and a fixing portion for removably fitting with the driver's seat side to restrict movement of said adjust member.

13. The seat height adjustment apparatus adapted for use with a motorcycle according to claim 12, wherein each of said stepped portion and said fitting portion is formed in two rows.

14. The seat height adjustment apparatus adapted for use with a motorcycle according to claim 11, wherein an erroneous assembly preventing member for disabling part of said adjust member from fitting with said vehicle body side fixing member when the part of said adjust member is assembled in error to said vehicle body side fixing member is provided between said adjust member and said vehicle body side fixing member.

15. The seat height adjustment apparatus adapted for use with a motorcycle according to claim 11, wherein where the motorcycle includes a passenger's seat disposed rearwardly of the driver's seat, a stepped fixing member corresponding to said stepped portion is provided on the bottom plate at a rear portion of the driver's seat, and a coupling member for coupling the stepped fixing member to a front end of the passenger's seat is provided at a rear end portion of said stepped fixing member.

16. The seat height adjustment apparatus adapted for use with a motorcycle according to claim 11, wherein said fixing member is fastened to a vehicle body frame together with a fuel tank.

17. The seat height adjustment apparatus adapted for use with a motorcycle according to claim 11, wherein said adjust member is formed from a left adjust member and a right adjust member removably mounted on a left stepped portion and a right stepped portion which are provided in a left and right pair on the bottom plate of the driver's seat.

18. The seat height adjustment apparatus adapted for use with a motorcycle according to claim 11, wherein three stepped portions are mounted relative to each side of the driver's seat for enabling three distinct positions of the height of the driver's seat.

19. The seat height adjustment apparatus adapted for use with a motorcycle according to claim 11, wherein the adjusting member includes an abutting portion, said abutting portion including a contacting face and an abutting face for mating with the fixing member for fixing the adjusting member.

20. The seat height adjustment apparatus adapted for use with a motorcycle according to claim 11, and further including a central support member for engaging a rear portion of a driver's seat in one of a plurality of locations for fixing the height of the rear portion of the driver's seat depending on the adjustment of the height of a front portion of the driver's seat.

* * * * *